(12) United States Patent
Rai et al.

(10) Patent No.: US 10,810,784 B1
(45) Date of Patent: Oct. 20, 2020

(54) TECHNIQUES FOR PRELOADING TEXTURES IN RENDERING GRAPHICS

(71) Applicant: NVIDIA Corporation, Santa Clara, CA (US)

(72) Inventors: Pranava Ajith Rai, Bangalore (IN); Amit Jain, Gurgaon (IN)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 16/522,108

(22) Filed: Jul. 25, 2019

Related U.S. Application Data

(60) Provisional application No. 62/876,957, filed on Jul. 22, 2019.

(51) Int. Cl.
| | |
|---|---|
| *G06F 12/0862* | (2016.01) |
| *G06T 1/60* | (2006.01) |
| *G06T 15/04* | (2011.01) |
| *G06F 12/0811* | (2016.01) |
| *G06F 9/38* | (2018.01) |
| *G06F 12/02* | (2006.01) |
| *G06F 17/11* | (2006.01) |
| *G06T 15/00* | (2011.01) |

(52) U.S. Cl.
CPC ............ *G06T 15/04* (2013.01); *G06F 9/3877* (2013.01); *G06F 12/0246* (2013.01); *G06F 12/0811* (2013.01); *G06F 12/0862* (2013.01); *G06T 1/60* (2013.01); *G06F 17/11* (2013.01); *G06F 2212/6024* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 6,433,789 | B1* | 8/2002 | Rosman | G06T 1/60 345/582 |
| 7,190,284 | B1* | 3/2007 | Dye | G06F 12/023 341/51 |
| 7,916,149 | B1* | 3/2011 | Donovan | G06T 15/04 345/530 |
| 2004/0151372 | A1* | 8/2004 | Reshetov | G06T 9/005 382/166 |
| 2005/0275658 | A1* | 12/2005 | Sasaki | G06F 12/0844 345/557 |

(Continued)

*Primary Examiner* — Joni Hsu
(74) *Attorney, Agent, or Firm* — Nixon & Vanderhye, P.C.

(57) ABSTRACT

Systems and methods for improved texture mapping and graphics processing are described. According to an example implementation, whole or parts of texture blocks are prefetched to an intermediate cache by a processing unit so that the same processing unit or another processing unit can subsequently obtain the prefetched texture block from the intermediate cache. Moreover, in some example implementations, control circuitry associated with the intermediate cache may throttle prefetch requests in order to avoid the memory system and/or the interconnect system receiving excessive amounts of prefetch requests. Additionally, in some implementations, deduplication of prefetch requests can be performed at the intermediate cache and/or the processing unit. Some implementations also include an efficient technique for calculating the address of the next texture block to be prefetched.

23 Claims, 17 Drawing Sheets

(56) References Cited

U.S. PATENT DOCUMENTS

| | | | |
|---|---|---|---|
| 2008/0104327 A1* | 5/2008 | Duncan | G06F 12/0862 |
| | | | 711/137 |
| 2009/0315908 A1* | 12/2009 | Comparan | G06T 15/04 |
| | | | 345/582 |
| 2012/0110269 A1* | 5/2012 | Frank | G06F 12/0862 |
| | | | 711/137 |
| 2013/0138887 A1* | 5/2013 | Chou | G06F 12/0862 |
| | | | 711/122 |
| 2015/0089151 A1* | 3/2015 | Bolz | G06F 12/0815 |
| | | | 711/141 |
| 2017/0243319 A1* | 8/2017 | Wittenbrink | G06F 9/451 |
| 2017/0256025 A1* | 9/2017 | Abraham | G06T 15/04 |
| 2018/0293102 A1* | 10/2018 | Ray | G06T 1/20 |
| 2019/0197760 A1* | 6/2019 | Cho | G06T 17/20 |

\* cited by examiner

FIG. 1C

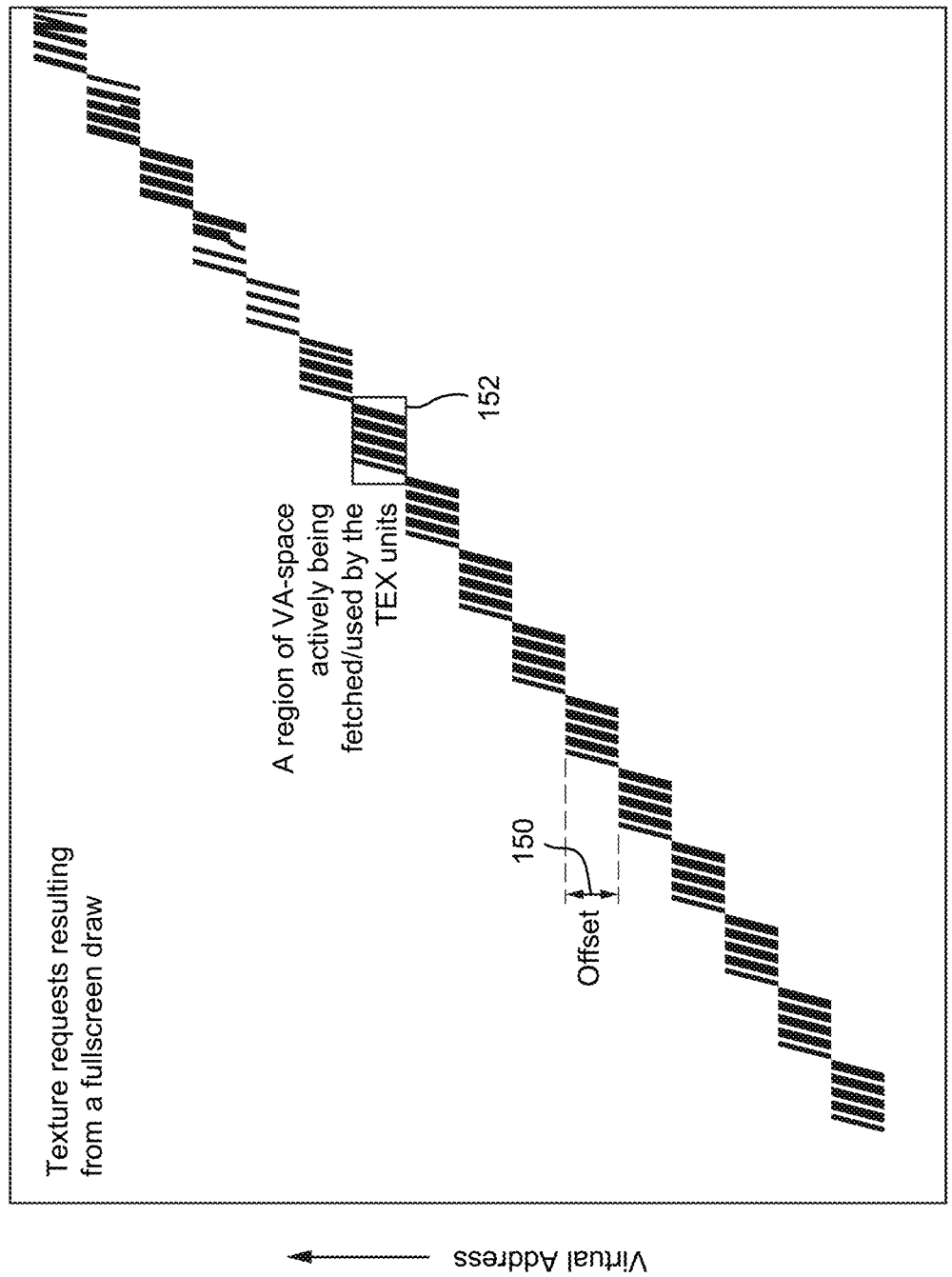

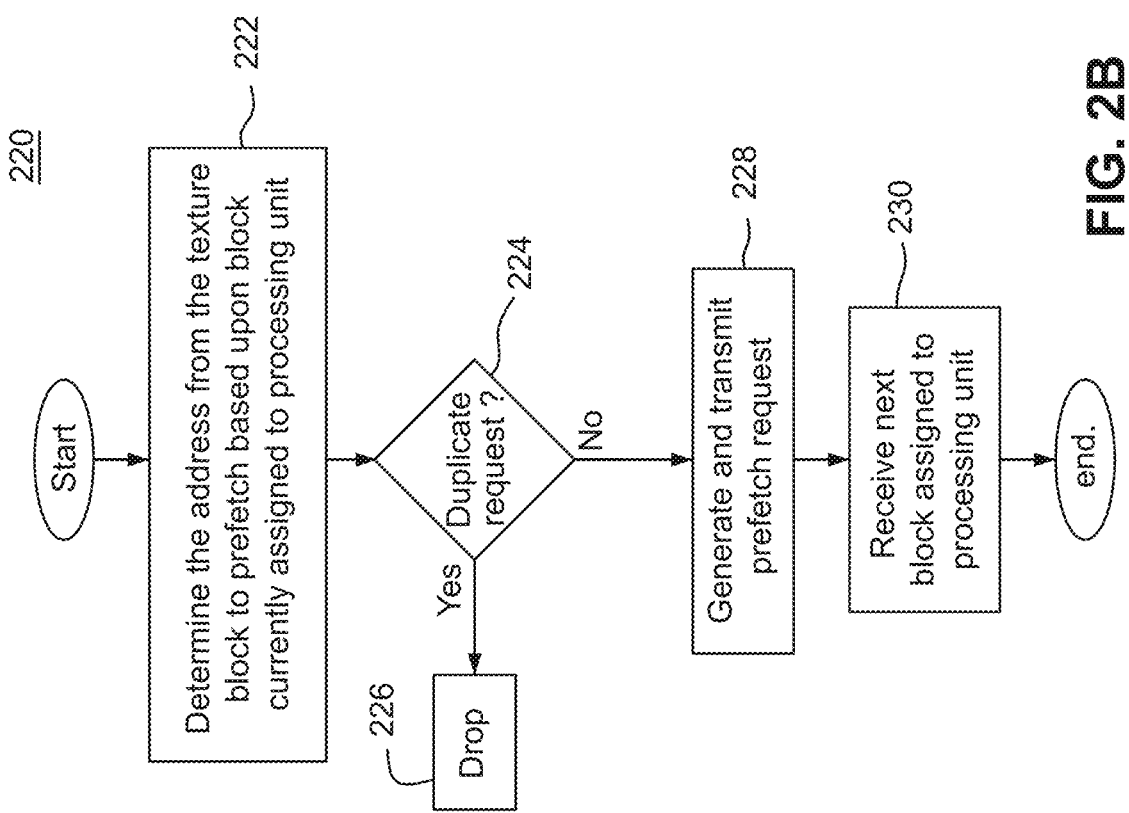

TECHNIQUES FOR PRELOADING TEXTURES IN RENDERING GRAPHICS

CROSS-REFERENCE TO RELATED APPLICATIONS

This application claims priority to U.S. Provisional Application No. 62/876,957 filed Jul. 22, 2019, the entire content of which is hereby incorporated by reference.

TECHNICAL FIELD

This disclosure relates to computer graphics, texture mapping and more particularly to systems and methods for fetching textures from memory for graphics processing.

BACKGROUND

Smart televisions, portable phones and other smart devices, video game systems, transportation user interfaces such as car and airplane heads up displays, smart glasses and virtual reality goggles, and many other devices have the ability to generate 3D computer graphics. Users commonly expect their computer graphics systems to be able to generate photo-realistic images of arbitrarily-complex scenes in real time. One common way to reduce the complexity of a scene is to model it as a surface onto which an additional image is mapped. Just like an oil painting on a canvas, the rendered 3D model can appear to contain many complex elements (e.g., the shadows and light play on Notre Dame cathedral, the thousands of leaves of a tree, the hundreds of bricks in a brick wall, or the exquisite wood grain of a conference room table) while avoiding the need to model each such element. Basically, an image showing such complexity is virtually pasted or mapped onto surfaces of the rendered model. The additional image is conventionally referred to as a "texture", and the process for applying the texture to the model surface is called "texture mapping."

Often, the textures are captured or created beforehand and stored in memory. When the graphics system renders the surface, it fetches the necessary texture image data (texture elements or "texels") from memory and applies the texture image to the surface using a mapping process that scales and filters the image appropriately. Because textures can themselves be rich, complicated images, they are often compressed to reduce storage requirements. A graphics processing "texture mapper" often includes the ability to decompress texture images as they are fetched from memory. Furthermore, textures typically may be stored in a variety of different formats depending on the usage.

Some prior graphics systems for example provided special texture cache and surface memories used to store textures in special internal formats that provided more efficient access. As one example, according to the NVIDIA CUDA programming guide version v10.1.105 used to program certain NVIDIA products, CUDA arrays (opaque memory layouts optimized for texture fetching) are one dimensional, two dimensional, or three-dimensional and composed of elements, each of which has 1, 2 or 4 components that may be signed or unsigned integer or floating point values of different resolutions. In some example non-limiting NVIDIA graphics systems, CUDA arrays are accessible by kernels through texture fetching or surface reading and writing. A texture object or texture reference specifies the texture in terms of a piece of texture memory that is fetched. Dimensionality specifies whether the texture is addressed as a one dimensional array using one texture coordinate, a two-dimensional array using two texture coordinates, or a three-dimensional array using three texture coordinates. Elements of the array are texels. The texture width, height, and depth refer to the size of the array in each dimension. In such implementations, the texture fetch itself may provide linear filtering or "mip mapping" which can involve resampling to map the texture onto a particular locality of a surface on which the texture is to be displayed.

It was also advantageous to store textures in different formats for more efficient access. See for example U.S. Pat. No. 7,916,149, incorporated herein by reference. In particular, so-called "pitch linear" format is a common format for storing textures. In such "pitch linear" format, the texels are stored sequentially in memory, i.e., texels in a given row of a rectangular texture area (the "pitch") are stored sequentially and then the texels in the next row are stored sequentially and so on. In such format, each texel row is thus stored in sequentially increasing memory locations. This "pitch linear" layout is fine if the texels will be accessed horizontally across each row. However, typical access patterns often have 2D (or 3D for 3D textures) spatial locality. Thus, accesses that are closely spaced in time are likely to proceed to nearby texels in any direction, not just horizontally. The orientation of this spatial locality usually cannot be predetermined, as it often depends upon the observer's point of view. Thus, the same texture will have different patterns of spatial locality as the observer moves around.

As an alternative, texel data may be stored in a computer-readable medium in a "block linear" format. In "block linear" format, the memory is logically organized into a plurality of blocks, which are a function of a specific page size of a particular implementation (for example, a cache line size). Texels are stored in xy(z) block ordering. Within each block, the texels are stored sequentially in memory, i.e., texels in a given block are stored sequentially and then the texels in the next block are stored sequentially and so on. In such format, each texel block is thus stored in sequentially increasing memory locations. In an exemplary block linear format, a page of memory contains 8 sequential 4-byte texels (e.g., 32 bytes) in 32 sequential rows. The memory access costs (e.g., latency) of block linear format is proportional to the total number of page boundaries.

One way to use such "block linear" format to further reduce paging penalties is to organize or define such blocks as memory "tiles". All texels within a tile reside in the same physical or virtual memory page. Such tiling can reduce penalties for crossing memory pages. See for example https://developer.nvidia.com/gpugems/GPUGems2/gpugems2_chapter12.html an electronic version of chapter 12 of GPU Gems 2 (NVIDIA 2005).

While legacy and backward compatibility can be an issue, the approaches described above have been significantly impacted by technological and conceptual advances. In particular, the graphics processing unit (GPU) is now, in its structure and operation, a more generalized high performance computation device not restricted to graphics processing. For these and other reasons, the dedicated texture caches of the past are much less used and useful. Instead, a more generalized memory architecture using multiple cache memory levels (similar in some aspects to CPU cache memory architectures) has increasingly been used to reduce memory latency of high performance GPUs.

In more detail, as processor speeds increase, other aspects of processor latency, such as memory access latency and intra-chip communication latencies, become more significant. Parallel processors, such as modern high performance graphics processing units (GPU), have multiple fast processing cores and are thus often even more substantially affected by memory access latencies and the like. The trend in modern GPUs towards increasing significance of memory access latencies, may hurt the performance scaling of new multi-processor GPUs. In one recently released GPU, for example, a 50% increase in computing power overall throughout its processing units is estimated to have yielded an improvement in performance of only 32-39% on average depending on the workloads. As bigger chips are being built, the latency limitations of processors are expected to continue to increase in significance as a proportion of overall system performance loss.

Memory access requirements for a GPU performing graphics processing may be substantially different from the memory access requirements of a CPU executing a typical CPU workload. Because textures can be very large, texture accesses as discussed above are one of the most affected due to memory latency, and they also often make up the largest chunk of dynamic random access memory (DRAM) read traffic in typical graphics workloads. Texture processing units and/or other processors may load textures (also referred to as "texture maps") from memory, so that sampled texture values can be provided to use in shaders and image rendering. Due to the lack of adequate latency hiding in texture mapping units or other inability of the texture mapping units to prevent texture retrieval latency from causing a bottleneck, processors may fall short of their optimal performance when long memory accesses are encountered in a workload. For example, greater than 1000 clock cycle memory latency outliers are not uncommon. Such slowing down of processors may often result in underutilization of the memory subsystem and starving the memory system for requests.

Conventional systems employ many techniques in order to alleviate the performance degradations caused by long memory access latencies. Such techniques include pipelining (in CPU and GPU environments), and data prefetching (primarily in CPU environments). However, these conventional techniques may not sufficiently address the latencies associated with fetching the large and varied textures of modern graphics processing. Therefore, improved low latency systems and techniques are desired for accessing textures in graphics processing systems.

SUMMARY

Example embodiments rectify some of the deficiencies of the techniques described above for texture processing.

An example embodiment provides a method for displaying a scene. The method includes: while performing texture mapping of the scene using a first block of a stored texture, generating a prefetch request, by a processor, to retrieve all or part of a second block of the stored texture from a first level memory of a memory hierarchy; retrieving said all or part of the second block from the first level memory in response to the prefetch request; storing the retrieved all or part of the second block in an area of a second level of memory of the memory hierarchy, wherein said area of the second level of memory is accessible by the processor and another processor, and wherein the second level of memory is an intermediate level of memory between the first level of memory and a third level of memory in the memory hierarchy; performing texture mapping of the scene using the retrieved all or part of the second block; and rendering the scene to a display device. In some example implementations, the texture mapping of the scene using the first block may be performed by the processor and the texture mapping of the scene using the second block may be performed by said another processor.

Another example embodiment provides a parallel processing system for displaying a scene. The system comprises a plurality of processors, a cache hierarchy including at least a first level cache memory and a second level cache memory, a display interface, and a memory interface configured to provide the plurality of processors access to an off-chip memory. The plurality of processors and control circuitry associated with the cache hierarchy are configured to, while performing texture mapping of the scene using a first block of a stored texture, generate a prefetch request, by a first processor from the plurality of processors, to retrieve all or part of a second block of the stored texture from a memory hierarchy which includes the cache hierarchy. The plurality of processors and control circuitry associated with the cache hierarchy are further configured to: retrieve the requested all or part of the second block from the off-chip memory over the memory interface in response to the prefetch request; store the retrieved all or part of the second block in an area of the second level cache memory, wherein said area of the second level cache memory is accessible by the first processor and a second processor from the plurality of processors, and wherein the second level cache memory is an intermediate level of memory between the off-chip memory and the first level cache memory; perform texture mapping of the scene using the retrieved all or part of the second block; and rendering the scene to a display device over the display interface.

An example embodiment provides a system-on-chip (SoC) which includes at least one central processing unit (CPU), and at least one parallel processing unit (PPU) connected to the CPU. Each PPU includes a plurality of multiprocessors, a plurality of special function units, a cache hierarchy including at least a first level cache memory and a second level cache memory, and a memory interface configured to provide access to an off-chip memory.

The plurality of special function units and control circuitry associated with the cache hierarchy are configured to, in response to an instruction received from one of the multiprocessors, perform a plurality of operations. The operations include, while texture mapping of a scene using a first block of a stored texture, generating a prefetch request, by a first special function unit from the plurality of special function units, to retrieve whole or part of a second block of the stored texture from a memory hierarchy which includes the cache hierarchy. The operations also include retrieving the requested whole or part of the second block from the off-chip memory over the memory interface in response to the prefetch request, storing the retrieved whole or part of the second block in an area of the second level cache memory, wherein said area of the second level cache memory is accessible by the first special function unit and a second special function unit from the plurality of special function units, and wherein the second level cache memory is an intermediate level of memory between the off-chip memory and the first level cache memory, texture mapping of the scene using the retrieved whole or part of the second block, and rendering the scene to a display device over a display interface.

BRIEF DESCRIPTION OF THE DRAWINGS

FIG. 1C schematically illustrates a texture organized in memory in accordance with a pitch-linear format.

FIG. 1E illustrates a relationship between the virtual addresses of texture data chunks in memory and the time of rendering for that chunk, according to some example embodiments.

FIG. 2B shows a flowchart for a process performed by a processor and/or a texture processing unit of a GPU to prefetch texture data, according to some example embodiments.

DETAILED DESCRIPTION

Figure 1A:
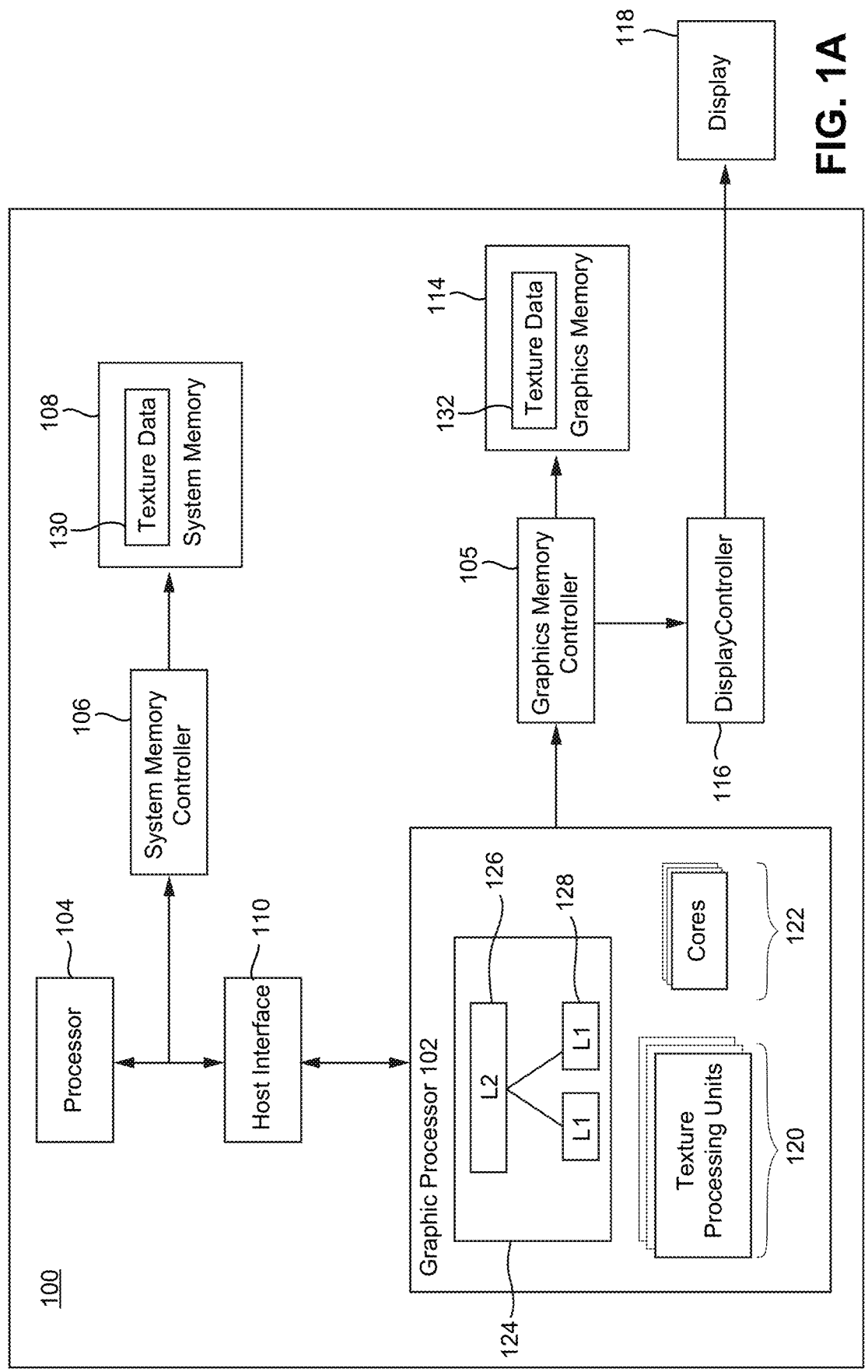
FIG. 1A is a block diagram of a system providing improved texture rendering, according to certain example embodiments.

Embodiments of the present invention provide for more efficient texture mapping by reducing memory access latencies associated with accessing texture data in memory during graphics processing. Although pipelining techniques can reduce the slowing down effects associated with texture access in various applications, it is often the case that latency hiding provided by pipelining techniques is inadequate for some of the longer latencies associated with certain texture accesses. Conventional prefetching techniques too, such as those used by CPUs, may not be sufficiently effective for texture processing in environments with multiple processors. Example embodiments provide improved texture prefetching techniques and systems that yield improved memory utilization and/or decreased effective memory latency during graphics processing, thereby yielding improved system performance.

Certain example embodiments improve memory utilization and/or decrease effective memory latency in GPUs. The improvements are achieved by speculatively fetching data that hasn't yet been actually requested by any processing unit into an intermediate cache such as, for example, a level 2 (L2) cache. The speculative fetching before the data is actually requested by a processing unit is referred to herein as "prefetching", and the request initiating such speculative fetching is referred to as a "prefetch request". More particularly, certain example embodiments provide for prefetching parts or whole of another (e.g., a next sequential) block of texture information into the L2 cache of a GPU, while the currently loaded block of texture information is being used and processed by the texture processing units and/or other processing unit of the GPU. Such speculative prefetches may sometimes fetch texture data that ends up not actually being used or needed (e.g., like the NASCAR pit stop crew that gets a new set of tires just in case the racer needs another tire change before the race ends), but can be effective in reducing wait time for retrieving new texture data from memory when the prefetched data is called for and needed for texture mapping.

While speculative prefetching is known primarily in CPU contexts, a challenge to applying such techniques in a texture retrieval context relates to how to predict what texture map data the texture mapper will need next or in the future. Due to a number of factors, texture mapping is often not an entirely predictable process. That it, unlike the NASCAR pit crew that knows exactly what tires the driver will need at the next tire change, it may be difficult to predict what block of texture data the texture mapper will need next when it is finished processing the texture data it has already retrieved from memory. Therefore, past attempts at prefetches/speculative loads of texture information have not necessarily been demonstrated to be useful for highly parallel graphics workloads. This lack of demonstrated success is at least partly attributable to difficulties in predicting or inferring texture map access patterns. The challenge results because texture memory accesses are highly variable depending on factors such as viewpoint, surface orientation and the like. The need to avoid performance regressions due to cache thrashing and/or extraneous DRAM traffic adds to the complexity.

Certain example embodiments target frequent memory access patterns such as, for example, full screen draws for increased efficiency. Such example embodiments, while they may improve system performance in many types of texture mapped displays, are particularly highly effective at improving texture access associated with fullscreen draws. Fullscreen draws are a very common occurrence in game applications, but also occur in many other applications. A fullscreen draw involves rendering an image to the entire screen, and is typically caused by a specific instruction included in the application program. In many games and other applications, when a fullscreen draw is being performed, the manner in which texture data stored in memory is consumed involves a specific pattern of memory address traversal. The texture prefetching techniques of example embodiments take advantage of such memory address traversal patterns.

For example, a full screen draw of a texture might actually be most efficiently served by a pitch linear texture format, since the full screen draw can usually be counted on to access each texel in ascending horizontal row order. However, the same texture may also be used in contexts other than full screen draws where spatial locality cannot be predicted beforehand. As an example, consider a virtual reality scenario in which a scene contains a virtual computer display (i.e. a display within the virtual reality display). The user may, depending on the viewpoint, view the in-scene virtual display in a variety of different orientations (e.g., from the side or even upside down). But the user may then shift his viewing orientation and position to view the virtual display head-on to fill the entire viewing frustum. In this simple example, efficiencies may result from storing the texture in block linear format, but block linear format may not be the most efficient storage representation for all uses of the texture (e.g., when it is displayed across the entire screen of the virtual reality display).

In certain example embodiments, while performing the prefetching of texture data, the offset for a block from which data is to be prefetched is dynamically calculated on a per-texture basis using information from the texture header. The dynamic computation allows the system to have separate offsets in use simultaneously for differently-sized textures.

In certain example embodiments, the processing unit making the prefetch request may be different from the processing unit that subsequently uses the prefetched data and thus benefits from it.

Moreover, in certain example embodiments, prefetch request throttling mechanisms are included to ensure that the memory hierarchy is not overwhelmed by the prefetching. Additionally, request deduplication may be performed to improve the efficiency of the prefetching. These optimizations may result in decreasing memory latency as seen by the texture units and/or other processing units, and may also improve cache hit-rates.

In experiments using example embodiments, texture information stored in a block linear layout was prefetched in a manner that substantially improved system performance. Whereas the block linear layout (described below in relation to FIG. 1D) of texture information in the memory and the associated address computation enabled by the block linear layout provide certain efficiencies, embodiments are not limited to the use of block linear layouts of texture.

Systems for Texture Prefetching

FIG. 1A illustrates a schematic block diagram of a system 100 configured to perform texture prefetching that reduces the performance degradations associated memory access latency effects, according to some example embodiments. The system 100 may be a system-on-a-chip (SoC) including one or more central processing units (CPUs) 104 and/or graphic processing units (GPUs) 102.

The GPU 102 may receive instructions and data from the CPU 104 via host interface 110. The GPU 102 accesses a graphics memory 114 via a graphics memory controller 105 and may also request data from a system memory 108 via the host interface 110 and a system memory controller 106. The system memory 108 may be shared between multiple processing units in the system such as, for example, the CPU 104 and GPU 102. The graphics data stored in the graphics memory 114 such as, for example, framebuffer information, can be displayed on a display 118 via a display controller 116.

The GPU 102 includes a plurality of processing cores 122 and a plurality of texture processing units 120. The processing cores may include parallel processing processor units that can run a large number of parallel threads. The processing cores receive and execute instructions from the CPU 104 or other processor in the system 100.

The GPU 102 also includes a cache hierarchy 124. The cache hierarchy 124 includes two or more levels of cache memories. The cache hierarchy may be structured so that each higher level cache memory serves two or more cache memories at the next lower level. For example, a level 2 cache memory (i.e. "L2 cache") 126 may be accessed by two or more level 1 cache memories (i.e. "L1 cache") 128. In this disclosure, the cache hierarchy 124 in combination with the graphics memory 114 and system memory 108 is referred to as the "memory hierarchy". During operation of the GPU 102, when seeking to access a piece of data, a particular processing core 122 may first search its L1 cache, then the L2 cache, and then the graphics memory 114 or the system memory 108.

This is similar to a cook searching their pantry before going to the store to retrieve a particular ingredient needed for a recipe. If the item is in the pantry, the cook can use it immediately. If the item is not in the pantry, the cook has to send someone to the store to get it, which takes time. If the store doesn't have it in stock, the store must order it from a distributor, which takes even more time. Thus, "latency" or time delay associated with obtaining ingredients from the local pantry in your home is quite low, but you also don't have room in your pantry to store everything you might possibly need and furthermore some of those items could spoil or lose freshness if stored in the pantry. Retrieving such items from the store may be worth the additional latency. Still, it may be helpful for the cook to plan ahead so they have all necessary ingredients before starting to cook.

Just like the pantry analogy above, the memory access latencies associated with access to the respective levels in the memory hierarchy are different. A particular core 122, for example, accesses data in its L1 cache 128 with less latency than data in the L2 cache 126. Accessing graphics memory 114 or the system memory 108 incurs significantly more clock cycles than accessing the L2 cache.

The texture processing units 120 are specialized processing units for processing texture information to be rendered onto scenes in images that are to be displayed. For example, while performing the graphics processing associated with rendering an image to a display (e.g. graphics processing pipeline), cores 122 may rely on texture processing units 120 to perform the texture mapping of that image. Each GPU 102 may include one or more texture processing units 120. Texture processing units 120 may not be limited to texture mapping, and may also perform processing tasks other than those related to texture information.

Texture information includes metrics that define the texture of an image and respective objects in the image. The texture information may include information about spatial arrangement of color or intensities in various regions of the image. The texture data may be calculated by image processing. Often the texture information associated with the image to be displayed on the display screen is too large to be stored in a memory on-chip on the GPU and is therefore stored in an external memory (e.g. an off-chip memory) such as system memory 108 or graphics memory 114 (e.g. texture data 130 in system memory 108 or texture data 132 in graphics memory 114).

As noted above, the retrieval of texture information from system memory can often incur long latencies leading to inefficiencies in the system. In some instances such latencies may be in the thousands of clock cycles. In example embodiments, the texture units 120, processing cores 122 and/or the cache memory hierarchy 124 may be configured with additional circuitry to perform prefetching of texture data in order to reduce the latency associated with texture data access. Description regarding configuration of GPU 102 to provide the prefetching according to example embodiments is provided below in relation to FIG. 2A etc.

Figure 3:
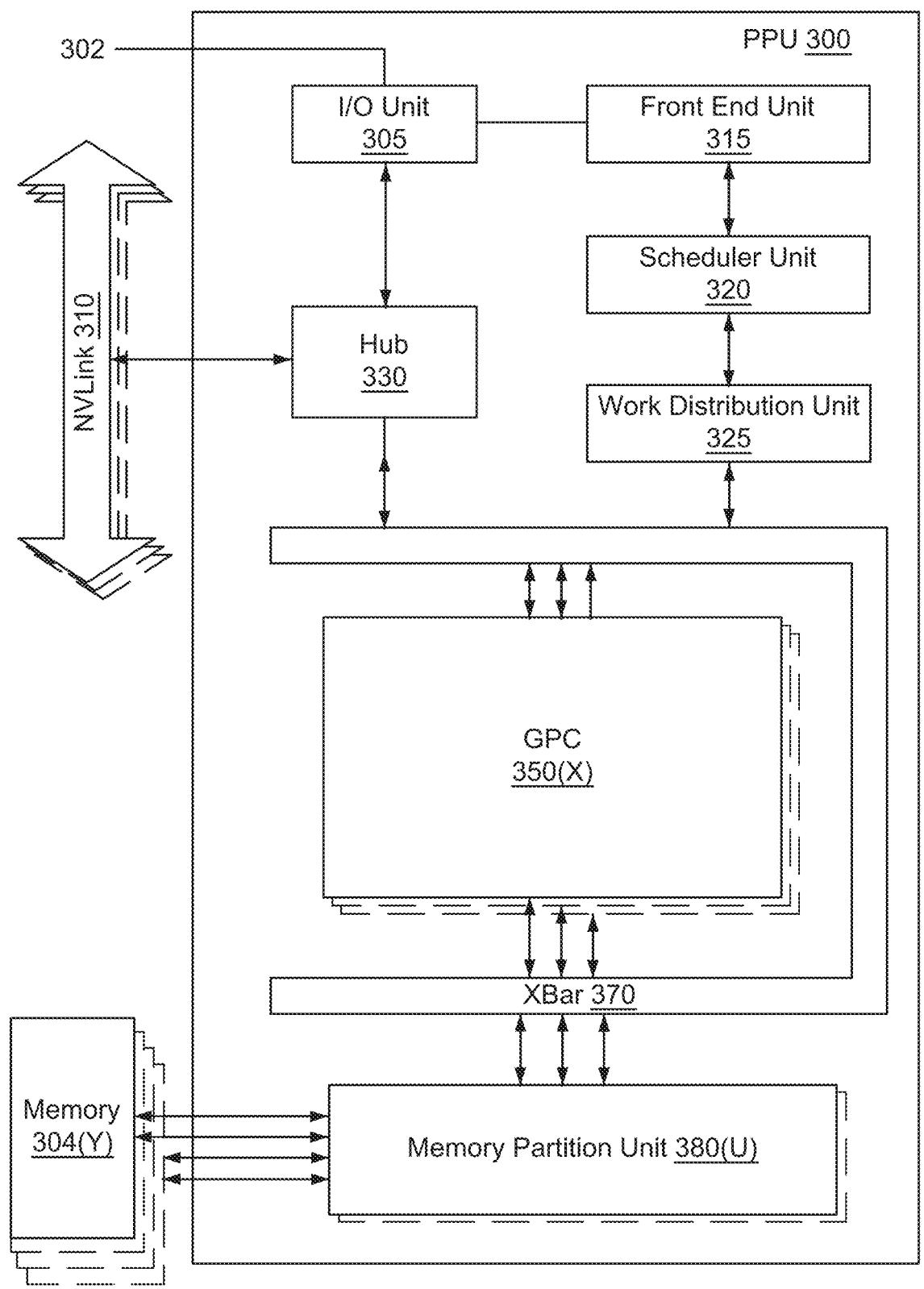
FIG. 3 illustrates a parallel processing unit, in accordance with an embodiment.

FIG. 3 and the associated description provide more detailed information about an example parallel processing unit (PPU) that may correspond to GPU 102.

Figure 1B:
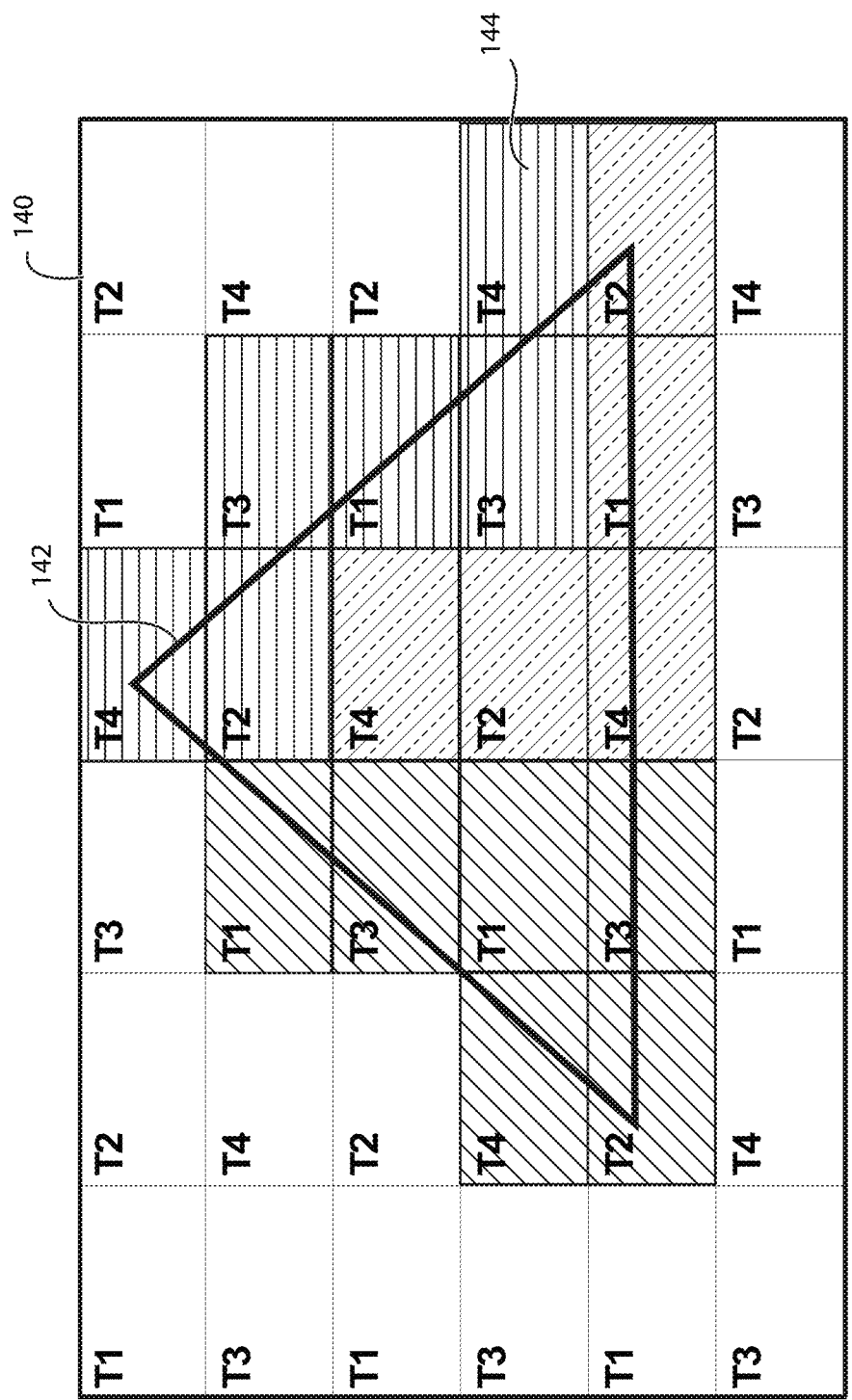
FIG. 1B illustrates an example texture allocation to processor cores.

FIG. 1B shows an example logical subdividing of a full display screen area 140 into rectangular tiles so that texture information to be rendered on the screen 140 can be distributed among a plurality of texture units 120. The illustrated example shows texture information 144 that occupies an area of the screen 140. The texture information is illustrated in FIG. 1B in three different fill patterns. When the GPU 102 is instructed to render an object such as object 142 to a screen, one or more processing cores 122 of the GPU 102 may allocate the texture mapping of the object 142 in the manner shown. That is, the texture mapping of object 142 may be allocated to each of four (T1-T4) of the texture processing units 120 in the manner shown. Each of the texture processing units 120 applies the texture 144 to respective portions of the surface(s) of object 142 as shown in FIG. 1B, for example.

The distribution of the texture information 144 among the texture processing units T1-T4 may be controlled by a core processing unit (e.g. core processing unit 120) in the GPU. In certain example embodiments, an instruction from the core processing unit to a texture processing unit may include information describing the texture 144, the object to be texture mapped 142, and the portion of the object 142 to be texture mapped by that texture processing unit. The texture information 144 provided by the core processing unit to the texture processing unit may include a header for the texture information 144 that describes the size and coordinates of the texture, the size of blocks in which the texture information is stored in memory, etc. Based on the information in the texture header, the object information and the information regarding the assigned portion of the object, each texture processing unit can determine the texture information to be retrieved in order to perform texture mapping of the portion of the object assigned to it.

As can be seen in FIG. 1B, during the texture mapping of a particular scene, each texture processing unit T1-T4 can be assigned multiple portions of the same object and respectively corresponding portions of the texture. The assignment may be determined by the tiling pattern of the texture processing units over the screen area, and the position, size and shape of the texture and object or scene to be texture mapped.

The pattern of assignment of texture processors shown in FIG. 1B is an example and is not limiting. In example embodiments, texture information may be distributed among any number of two or more texture processing units according to any pattern of assignment. Example embodiments are not limited to any tiling pattern of texture processing units over a screen area or any particular texture or scene/object characteristics.

Figure 1C:
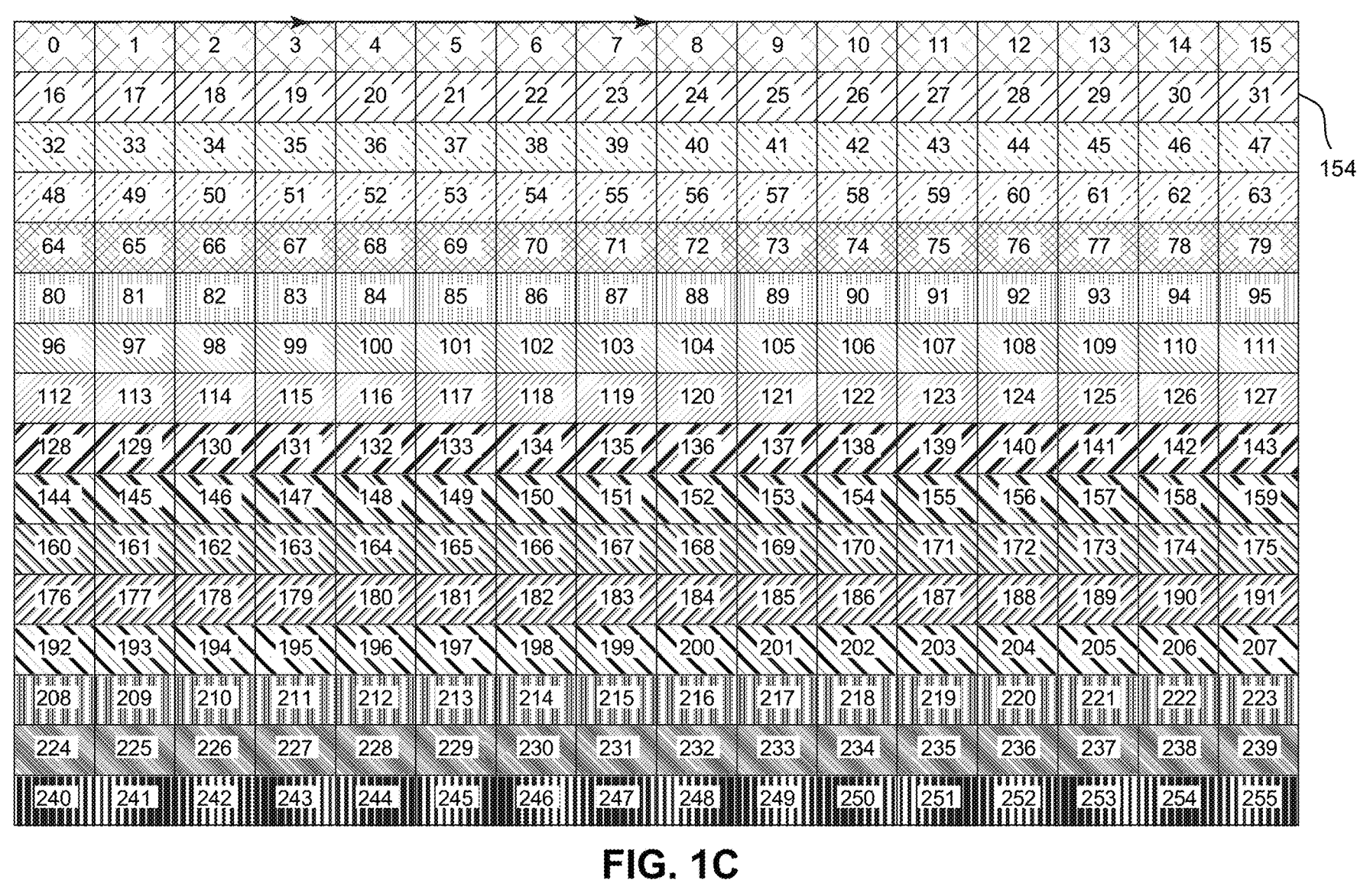

FIG. 1C illustrates an example non-limiting texture 154 organized in memory in accordance with a pitch-linear format. For example, a 16×16 texel area is shown where the numbers indicated inside the texture represent the respective virtual memory addresses (or offsets from a virtual memory address) at which the texels are stored. The size of a texel, in bytes, may differ from texture to texture depending on such things as the level of detail in resolution of the texture. The size of a texel in bytes in a particular texture may be indicated in the header of that texture.

According to the pitch linear format of storing texture information in memory, each row of texels from top to bottom of the texture is laid out in a manner that starts at the top left of the memory area and then extends horizontally left to right before beginning to store the next row of texels (e.g. left to right and top to bottom). FIG. 1C shows texels 0-255 of texture 154 arranged in memory in a pitch-linear manner. That is, each row of texels of texture 154 as it may be mapped into a rendered image on the display screen is stored in a row in the virtual memory. The memory in which texture 154 is stored may, for example, be an external memory such as system memory 108 or graphics memory 114.

Figure 1D:
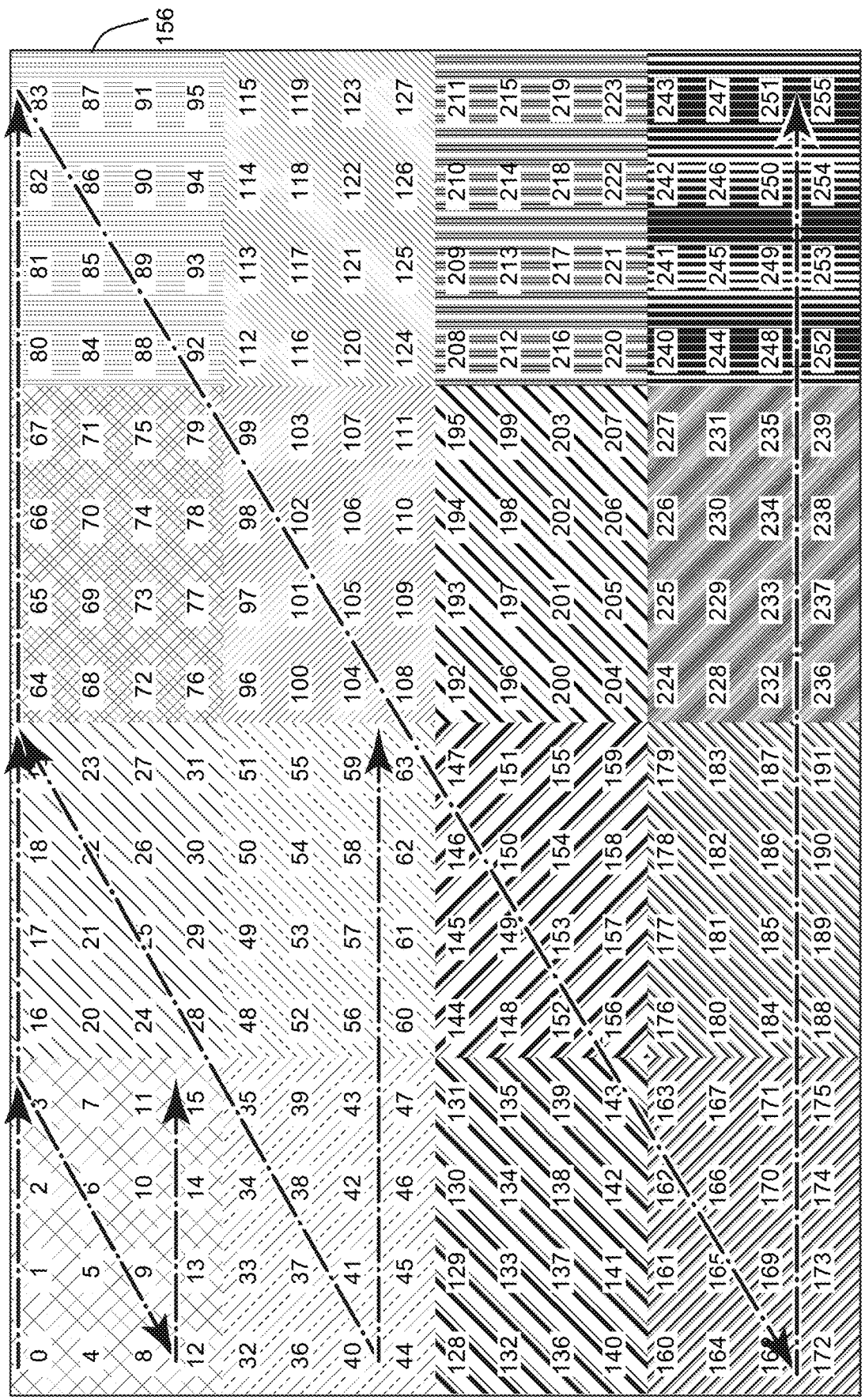
FIG. 1D schematically illustrates a texture organized in memory in accordance with a block-linear format.

FIG. 1D illustrates a texture 156 organized in memory in accordance with a block-linear format. As in FIG. 1C, FIG. 1D too shows an example a 16×16 pixel area screen layout where the numbers inside the texture 156 represent the respective virtual memory addresses (or offsets from a virtual memory address) specified in texels. The block linear format is optimized for many 2D and 3D access patterns. As shown in FIG. 1D, texels 0-15 and 16-31, which correspond to the first row and second row in the texture 156 arrangement in the memory, are each a 4×4 texel rectangular area (a "block") on the screen. In the example block linear layout, each row of texels in memory corresponds to a 4×4 block, and each four consecutive rows of texels in memory correspond to a 8×8 block. In FIGS. 1C and 1D, each 16-texel row in the memory layout is represented by a distinguishable fill pattern.

FIG. 1E illustrates texture requests resulting from a fullscreen draw. The illustrated example pattern shows the virtual addresses of the memory blocks that hold texture information over time. The x-axis represents increasing time from left to right, and the y-axis represents increasing virtual addresses from bottom to top. Each shaded area represents a chunk of memory accessed, and the location of the shaded area in the graph represents its position in time and its virtual address in relation to the beginning of accessing texture data for that fullscreen. Each chunk is made up of one or more contiguous blocks. In its entirety, FIG. 1E illustrates the texture data accessed for drawing a fullscreen.

The chunk 152 represents the virtual address space that is being currently used by the texture units processing the texture for the screen. As illustrated, the offset associated with each chunk 152 is the height 150 of each block (e.g. in texels). That is, the height of each chunk (e.g. in texels) can be used to represent the offset between consecutively requested chunks. In some example embodiments the chunk may have a height of one block.

Figure 1F:
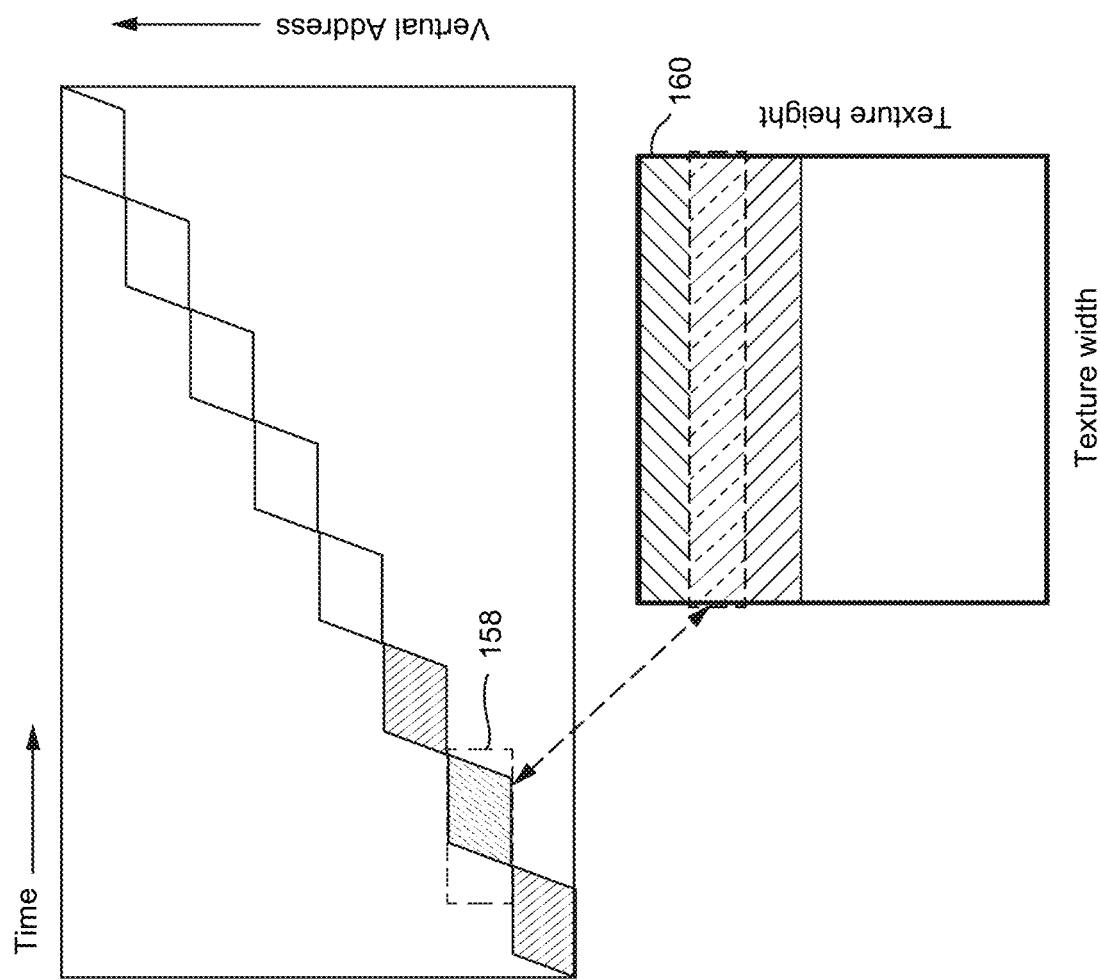
FIG. 1F provides another example illustration of the texture data organized in memory and its relationship to the texture rendered on the screen, according to some example embodiments.

FIG. 1F provides another example illustration of the texture data organized in memory and its relationship to the texture rendered on the screen, according to some example embodiments. This figure illustrates how each row of texture information 160 in memory maps to a chunk 158 according to a block linear layout.

Figure 1G:
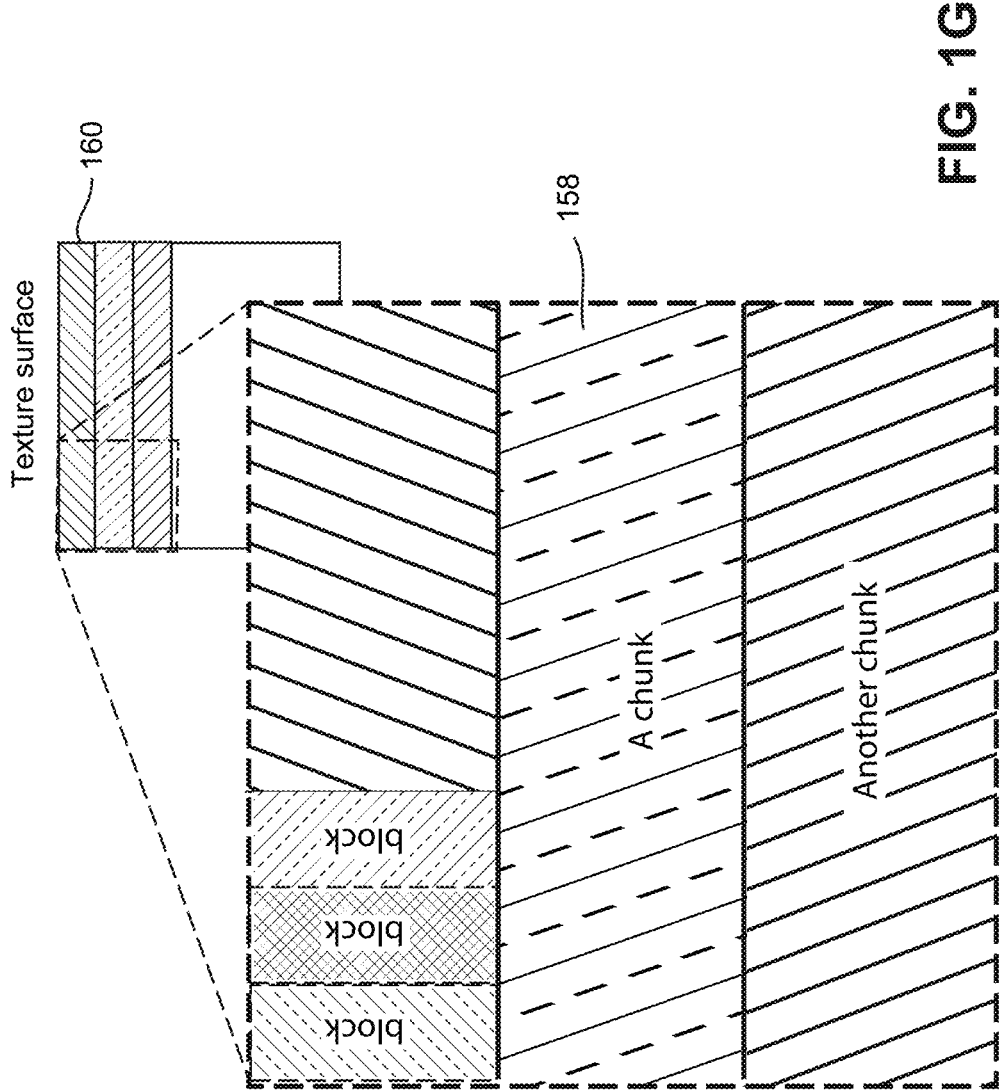
FIG. 1G illustrates the relationship between a texture, a chunk and a block according to some example embodiments.

FIG. 1G further illustrates graphically that, in some example embodiments, the texture surface 160 comprises a plurality of chunks such as chunk 158 and that each chunk comprises a plurality of blocks such as the blocks shown in the block linear layout of texture shown in FIG. 1D. In the illustrated example, each line of the texture information 160 corresponds to a respective chunk.

Figure 2A:
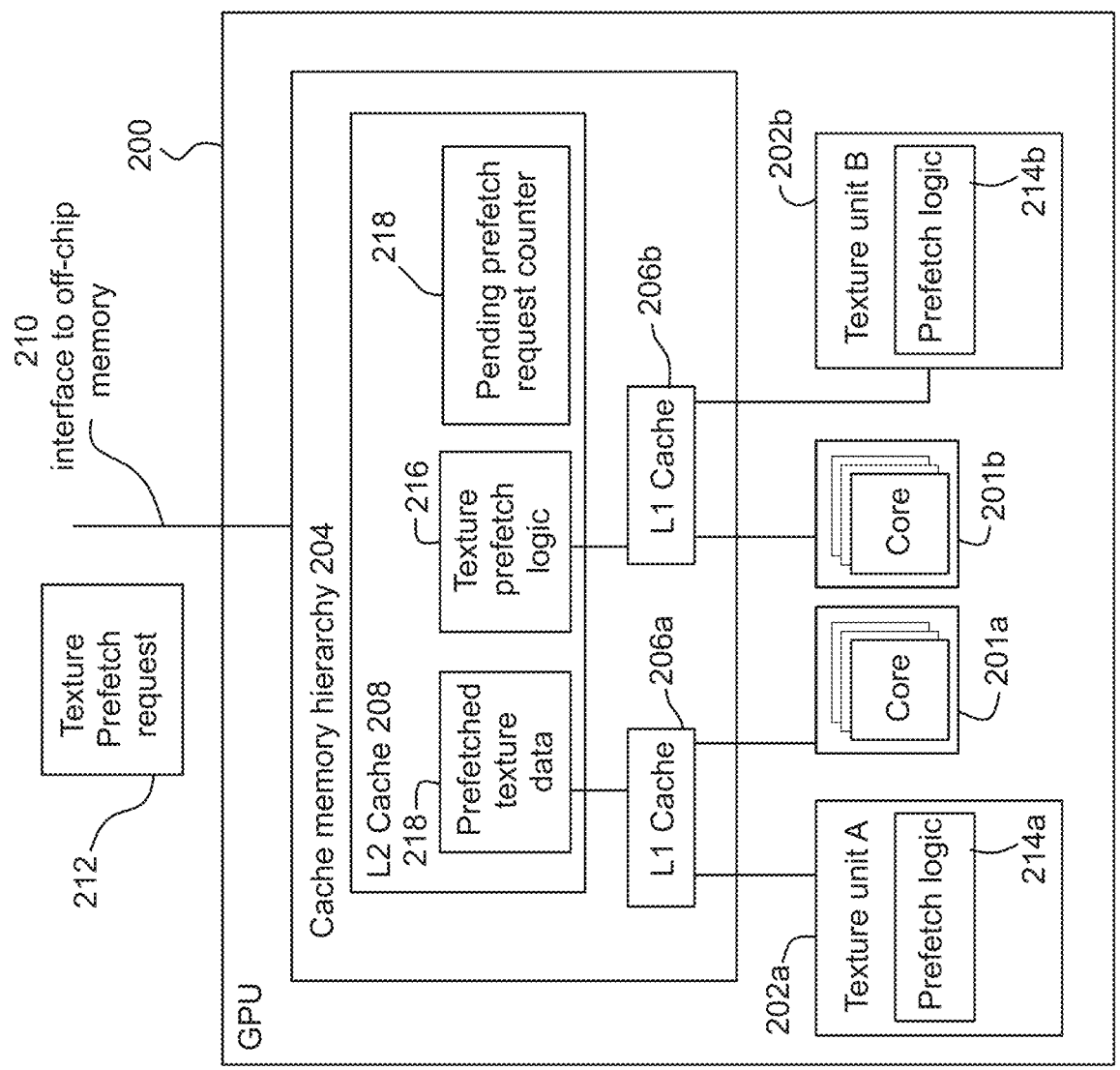
FIG. 2A is a block diagram of a graphics processing unit which may be used in the system of FIG. 1A, according to some example embodiments.

FIG. 2A is a block diagram of a GPU which may be used in the system of FIG. 1A, according to some example embodiments. For example, GPU 200 may correspond to GPU 102 shown in FIG. 1A.

GPU 200 includes processing cores 201 (processing core 201a and processing core 201b), texture processing units 202 (texture unit A 202a and texture unit B 202b), cache hierarchy 204 and an interface 210 to graphics memory (e.g.

graphics memory 114) and/or external memory such as system memory (e.g. system memory 108).

In the cache hierarchy 204, each L1 cache 206 may be accessed by a processing core and a texture unit. For example, L1 cache 206a is accessible to processing core 201a and texture unit A 202a, and L1 cache 206b is accessible to processing core 201b and texture unit B 202b. The processor cores 201 or texture units 202 can access L2 cache 208 for data that is not found in the L1 caches 206. If the data is not found in L2 cache 208, then the external memory (e.g. off-chip memory such as system memory or graphics memory) can be accessed through interface 210 to obtain the data.

Example embodiments cause each texture unit to, while it is processing a first block of texture information (or after it fetches and before it finishes processing the first block of texture information), prefetch all or parts of data from a second texture information block. The processing of a block of texture information may include using that texture information block for texture mapping an object and/or a scene. Prefetch logic 214 (e.g. prefetch logic 214a and 214b) blocks include hardware circuitry for calculating the address of the block of texture information to be prefetched. The address of the block to be prefetched is calculated based on the address of the block being processed currently and an offset. The texture prefetch logic 214 may also implement request deduplication to reduce the amount of duplicate prefetch requests being transmitted to the L2 cache.

According to example embodiments, the texture information prefetched 215 from external memory is stored in the L2 cache 208, rather than being provided to the requesting texture processing unit and/or the processing core. The prefetched texture information 215 in the L2 cache is available to multiple texture processing units and/or multiple processor cores that are connected to that L2 cache. Texture prefetch logic 216 hardware circuitry configured to store the prefetched information may be in the control circuitry associated with the L2 cache 208.

A pending prefetch request counter 218 is also associated with the texture prefetch logic 216 circuitry. The pending prefetch counter 218 keeps count of the number of texture prefetch requests 212 that are outstanding. That is, according to an embodiment, at the L2 cache, the counter is incremented when a texture prefetch request is transmitted from the L2 cache circuitry to external memory, and is decremented when texture information corresponding to the request is received and stored in the L2 cache. In combination with the pending prefetch request counter 218, the texture prefetch logic may implement a throttle mechanism to silently drop incoming prefetch requests when the count of pending prefetch requests exceed a predefined threshold. The texture prefetch logic 216 may also implement a request deduplication to reduce the amount of duplicate prefetch requests being transmitted to the external memory. The deduplication and/or throttling may, at least in some embodiments, be necessary in order to efficiently perform prefetching of textures while not overwhelming the memory system and system interconnects with extraneous prefetch requests.

According to some embodiments, GPU 200 may correspond to the PPU 300 shown, for example, in FIG. 3 and described in relation to FIGS. 3-6. The core processors 201 may correspond to the streaming multiprocessors (SM) 440 and the texture processing units 202 may correspond to the special functional units (SFU) 552. In such embodiments the texture prefetching described in relation to processes 220 and 240 may be performed during the processing of the graphics pipeline described, for example, in relation to FIG. 6.

Example Texture Prefetching Method

FIG. 2B shows a flowchart for a process 220 by which a processor requests texture information for processing, according to certain example embodiments. Process 220 may be performed by a core processing unit and/or a texture processing unit. In some example embodiments, the process 220 is performed by the prefetch logic 214 (e.g. in prefetch logic circuitry 214a and/or 214b) shown in FIG. 2A. For clarity, process 220 is described below in relation to texture processing unit 202a and core processing unit 201a, but process 220 is not limited to these processing units.

After entering process 220, while processing a texture information block n, at operation 222 the texture processing unit 202a determines a texture information block n+k to prefetch data from. k is the offset-size (also called the prefetch-offset) expressed as a multiple of the block-size. Each of the blocks n and n+k may be one block of a larger texture information A (e.g. block consisting of pixels/texels 0-15 in texture 156 shown in FIG. 1D). According to an example embodiment, texture processing unit 202a begins the processing of block n in response to the processing of block n being assigned to it by a core processing unit (e.g. core processing unit 201a or another core processing unit 201b). For example, core processing unit 201a may assign an instruction to the texture processing unit 202a to process block n. The texture information for block n may be received by the texture processing unit 202a from the memory hierarchy either in response to its own request or a request made by a core processing unit.

During the processing of block n, the texture processing unit determines a block n+k to prefetch data from. In some embodiments, each texture processing unit is configured to prefetch data from the immediately next block to the block currently being processed on that texture processing unit. However, in some embodiments, a block other than the immediately next block may be used to prefetch from.

Determining the data to be prefetched according to example embodiment may require the determining of an offset, in bytes, for the address of that block. In example embodiments in which a block linear address mapping layout is employed, the offset is the size of the chunk in bytes. The size of a chunk is a multiple of the size of a block. The block and chunk structures in such embodiments are a direct consequence of the block linear address mapping which is used to store many of the textures used by modern games. In such embodiments, the address of the next block can be determined based on the address of the current block and the offset, and similarly for the next chunk.

The block and chunk sizes may not be the same for all textures, and may be an intrinsic property of the texture. Therefore the offset may need to be dynamically calculated on a per-texture basis. Further, if there are multiple textures in use simultaneously, a separate offset may be maintained per active texture.

Each texture may include a header (a "texture header") that stores certain kind of information about that texture, such as, for example, its height, width, level of detail, data-type etc. In some example embodiments, the texture headers (and/or parameter values from the headers) are already available in the texture unit for all textures that are in active use at any given point in time. With access to parameters describing a particular texture in the corresponding header, some example embodiments compute the size of the chunk for a particular block linear texture as:

$$Size_{chunk} = Width_{texture} * Height_{chunk} * bytes\_per\_texel$$

$$Offset\text{-}Size \text{ or } Prefetch\text{-}Offset = Scaling\ Factor * Size_{chunk}$$

Thus the offset size can be computed economically at runtime using information available in the texture processing unit and/or processing core. For example, the offset can be calculated as the Offset Size in bytes. A scaling factor, F, may be used to arrive at a fine-tuned value of the prefetch-offset by multiplying it with the size of the chunk. For example, a smaller GPU might benefit from a value of F that is less than 1. A default value for the scaling factor may be 1.

After the offset is calculated, based on the block currently being processed in the texture processing unit and the calculated offset, the address of the block or part of the block to be prefetched is determined. For example, the address of the block or part of the next block to be prefetched may be determined by adding the offset to the address of the data from the current block. Prefetching the addresses belonging to the next chunk (i.e. addresses belonging to blocks or parts of blocks in the next chunk) to the L2 cache when the texture units are working on the current block (belonging to the current chunk) has been shown to improve performance in many workloads/applications such as, for example, game applications.

At operation 224, optionally a check may be performed to determine whether the intended prefetch request is a duplicate. This optional check may be economically performed with information available in the texture processing unit. For example, a register which keeps track of the identities of a predetermined number of the immediately preceding prefetches requested by the texture processing unit may be tested against the address calculated for the next block or part of block to be prefetched. If it is determined that the next block or part of block matches any of the recently prefetched requests (e.g. it is determined that the intended prefetch request is a duplicate), then the currently determined next block or part of block for prefetching is dropped 226 and operation 222 is repeated to determine another block or part of block to be prefetched (i.e. determine another request) which is not a duplicate of a block or part of block that has already been prefetched.

When it is determined at optional operation 224 that the determined next block or part of block for prefetching is not a duplicate, process 220 proceeds to operation 228. For example, when the prefetch request for all or part of block n+k is determined to be not a duplicate, then at operation 228 a texture prefetch request is generated for data from block n+k. The prefetch request may include a prefetch indication that distinguishes it from a texture fetch request. According to an example embodiment, the prefetch request, such as the prefetch request 212, includes a header having one or more bits identifying it as a prefetch request, and the address or offset of the requested block of texture information. In some embodiments, the prefetch request header may also include a unique identifier or address (e.g. address of the first block in the texture) for the texture The generated prefetch request is transmitted to the memory hierarchy. The transmitting may be performed in a manner similar to how a fetch request is transmitted from the texture unit to the memory hierarchy.

The handling of the generated prefetch request for the whole or some part of the block n+k in the memory hierarchy is described in relation to process 240 below.

After the completion of the texture processing (e.g. texture mapping) using block n, process 220 proceeds to operation 230. At operation 230, the texture processing unit 202a receives all or some part of the next texture block from texture A (e.g. such as another block from surface texture 156) to be processed. This next texture block may be obtained by one or more memory accesses made in response to one or more instructions received from a core processing unit. This next block may not be the block immediately following (according to the memory access pattern) block n of which the processing was just completed by texture processing unit 202a, and may be any other block m in the same texture A. Block m may have been obtained by the texture processing unit 202a from the L2 cache 208, where it may have been stored after being prefetched by another texture processing unit.

In some example embodiments, a determination as to whether the texture mapping is part of a particular type of rendering is made prior to generating the prefetch request at operation 222. In such embodiments, the generating of the prefetch request may be in response to the determination. For example, if the determination if made that the texture mapping is part of a full screen draw operation, then the prefetch request is generated and the prefetching processes 220 and 240 are completed. If the determination is that the texture mapping is not part of a full screen draw, then no prefetch is performed. The determination may be based on the instruction type. The determination may not be limited to the above described determination of full screen draws.

Figure 2C:
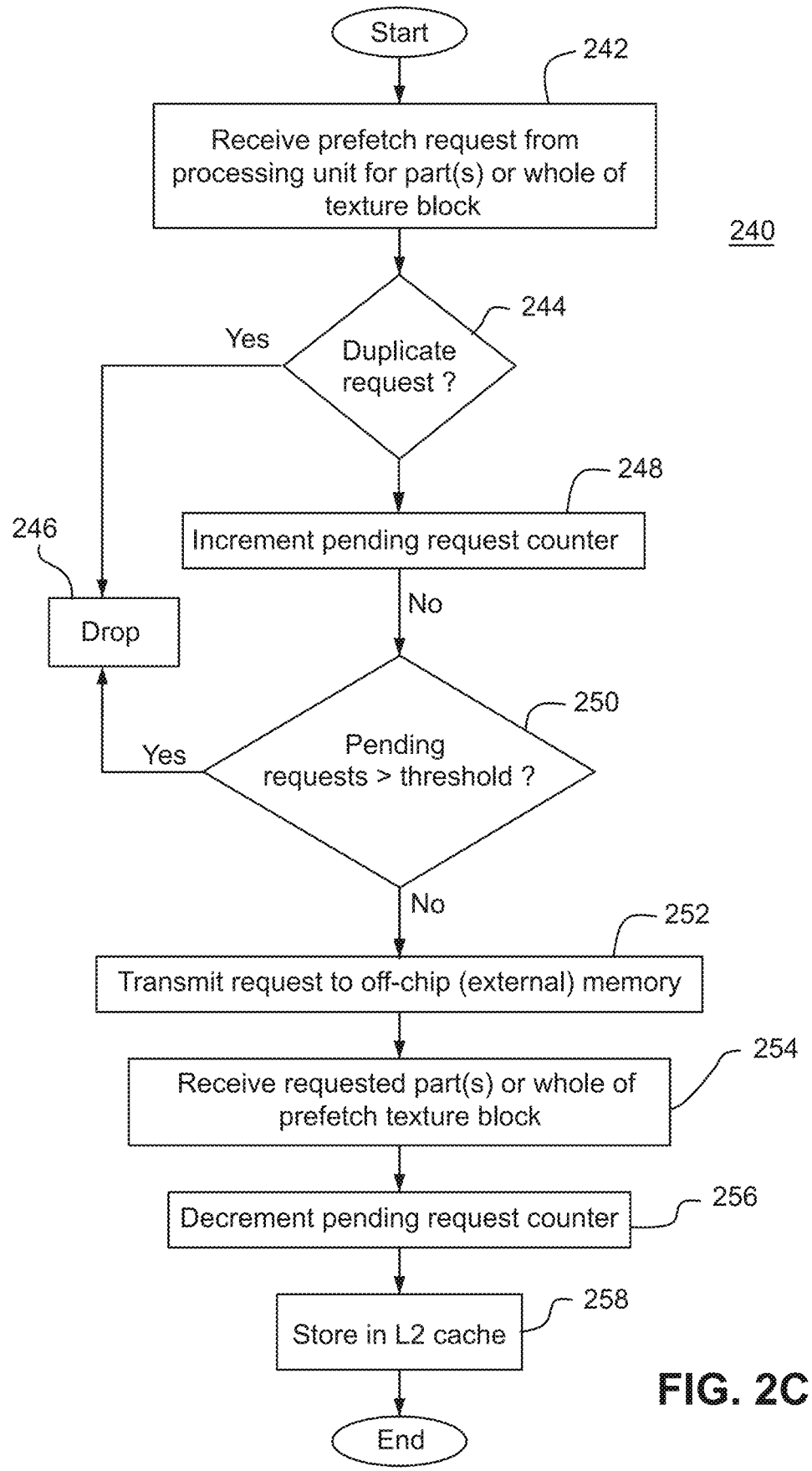
FIG. 2C shows a flowchart for a process performed by the memory hierarchy in response to the prefetching initiated by a processor and/or a texture processing unit of a GPU as shown in FIG. 2B, according to some example embodiments.

FIG. 2C shows a flowchart for a process 240 performed by the memory hierarchy in response to the prefetching initiated by a processor as shown in FIG. 2B, according to some example embodiments. Process 240 may be performed in full or in part in texture prefetch logic circuitry 216 that is associated with the L2 cache 208 and/or the cache hierarchy 204.

Process 240 may begin for each prefetch request received from a texture processing unit at operation 242. The generation and transmission of a prefetch request from a texture processing unit was described above in relation to FIG. 2B.

At operation 244, optionally, it is determined whether the received prefetch request is a duplicate of an already received and/or already serviced prefetch request. In order to avoid sending multiple prefetch requests into the same target address, some embodiments include a prefetch de-duplication scheme, where a second prefetch request is not sent for a read if one has already been sent due to an earlier read to the same cache-line (e.g. for multiple read requests into the same 128B/256B aligned address, only one prefetch request is sent to the address that is an offset number of bytes away from the 128B/256B aligned read address). This de-duplication may save bandwidth (e.g. request bandwidth and/or data bandwidth).

If the prefetch request is determined as a duplicate, then the received prefetch request is dropped at operation 246. If it is determined that the request is not a duplicate request, then process 240 proceeds to operation 248.

At operations 248-250, optionally, it is determined whether the received prefetch request increases a number of pending prefetch requests beyond a predetermined threshold. That is, upon receiving the prefetch request and optionally determining that it is not a duplicate, a counter that keeps track of the number of currently pending prefetch requests is incremented at operation 248. Then, at operation 250, it is determined whether the incremented count of pending prefetch requests exceeds a predetermined threshold. If the pending requests exceed the threshold, then the request is dropped at operation 246.

The throttling technique of operations 248-250 provides for addressing scenarios where the memory system might already be the limiting factor of performance due to excessive access requests. In such scenarios it is best to not burden the memory system further with speculative prefetch requests. Accordingly, the above described throttling scheme that utilizes information available regarding cache sectors with outstanding fill request to dynamically drop prefetch requests if the number of such outstanding sectors is above a certain threshold.

If the pending requests do not exceed the threshold, then process 240 proceeds to operation 252.

At operation 252, the prefetch request is transmitted to the external (e.g. off-chip) memory. In some embodiments, the access requests transmitted from the L2 cache to the external memory for fetch requests and prefetch requests may not be distinguishable from each other. In such embodiments, the L2 cache circuitry may keep track of the requested and received texture blocks so that the received blocks can be treated appropriately at the L2 cache depending on whether each is received for a fetch request or a prefetch request. In some other embodiments, the access requests transmitted from the L2 cache for prefetch requests may be distinguishable from those transmitted for fetch requests. In some embodiments, a memory block received at the L2 cache from the external memory may be accompanied by header information indicating whether it relates to a prefetch request.

At operation 254, the requested data from the prefetch block is received at the L2 cache. The L2 cache control circuitry may distinguish between requests to texture blocks associated with prefetch and those associated with fetch requests in any manner. Some example techniques by which such distinguishing can be performed was described in relation to operation 252.

At operation 256, in view of the receiving the data of the requested prefetched block (or parts thereof), the pending request counter is decremented.

At operation 258, the partly or fully prefetched block is stored in the L2 cache. According to some embodiments, unlike as is the case with fetch requests, the prefetched block-data is not provided to either the L1 cache or the requesting texture processing unit. The prefetched block-data is merely stored in the L2 cache. The processor that requested the prefetched block data or another processor may subsequently, by a fetch request, retrieve the prefetched block data that is stored in the L2 cache and store it in the L1 cache. Although in some embodiments, in completing the prefetch, the prefetched data may also be stored in the L1 cache and/or the texture processing unit that issued the prefetch request in addition to the L2 cache, such embodiments may be less efficient than embodiments that do not store the prefetched data in the L1 cache or the texture processing unit.

After operation 258, the prefetch operation is completed.

A Parallel Processing Architecture for Noise Reduction in Video

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
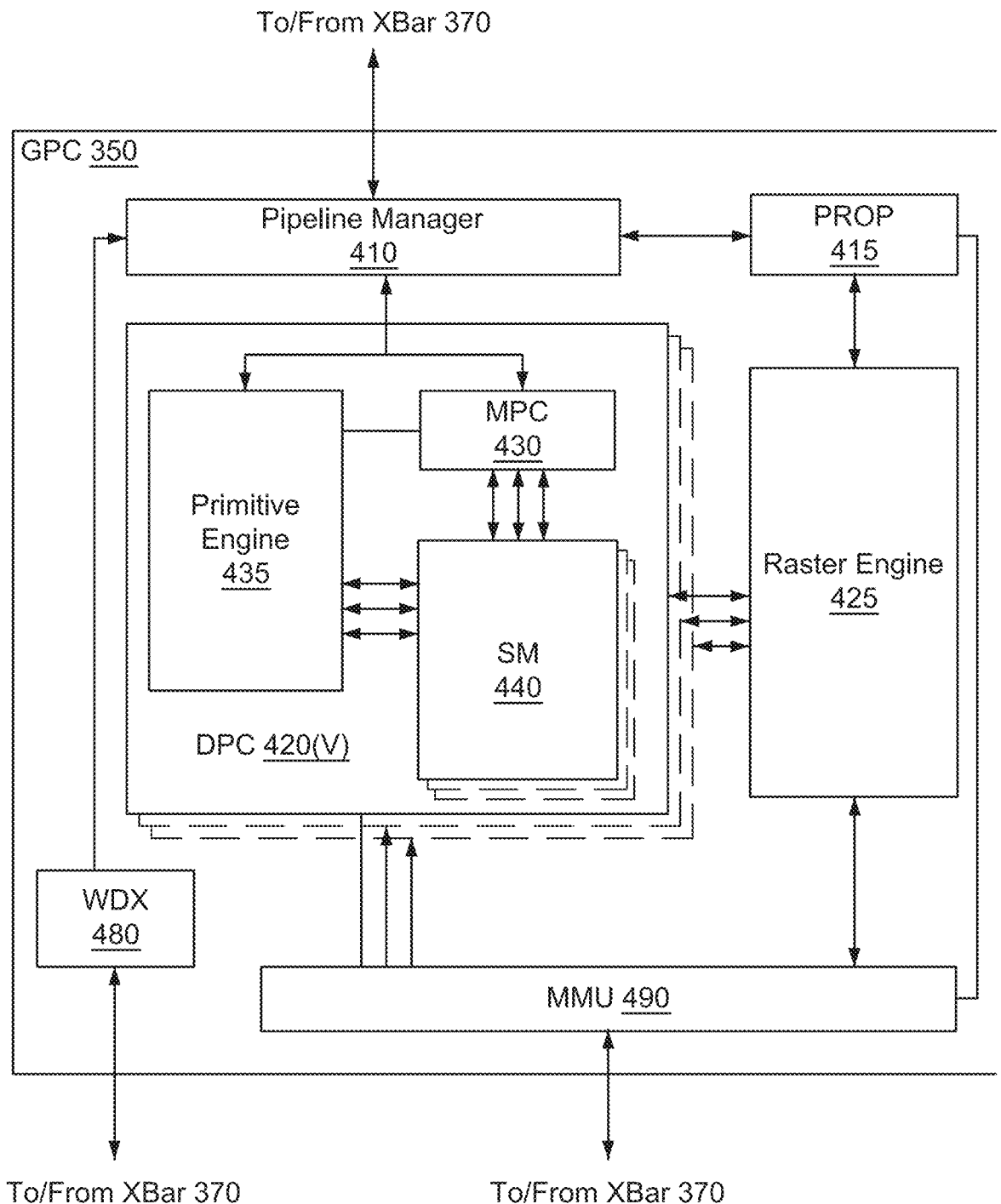
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
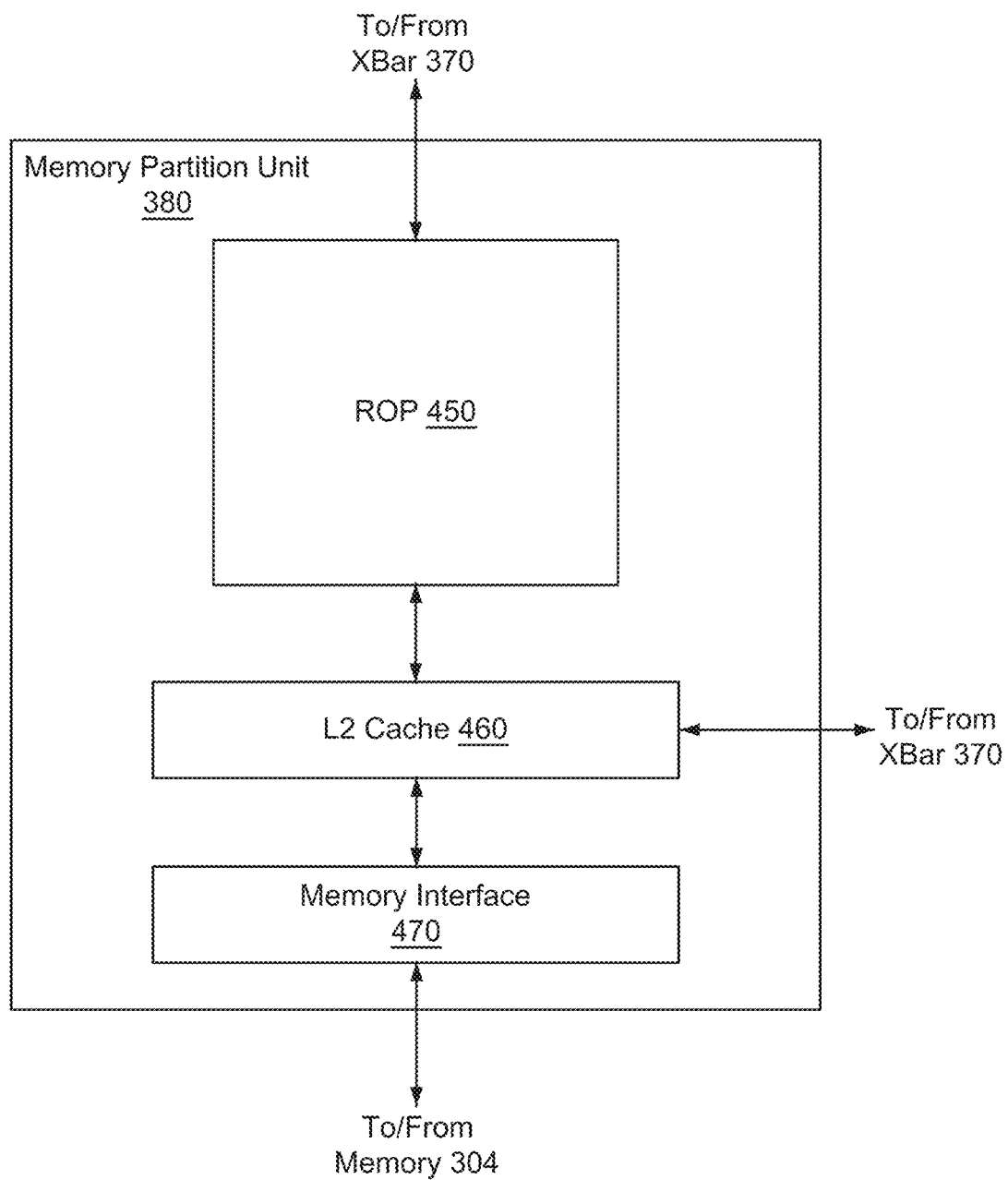
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
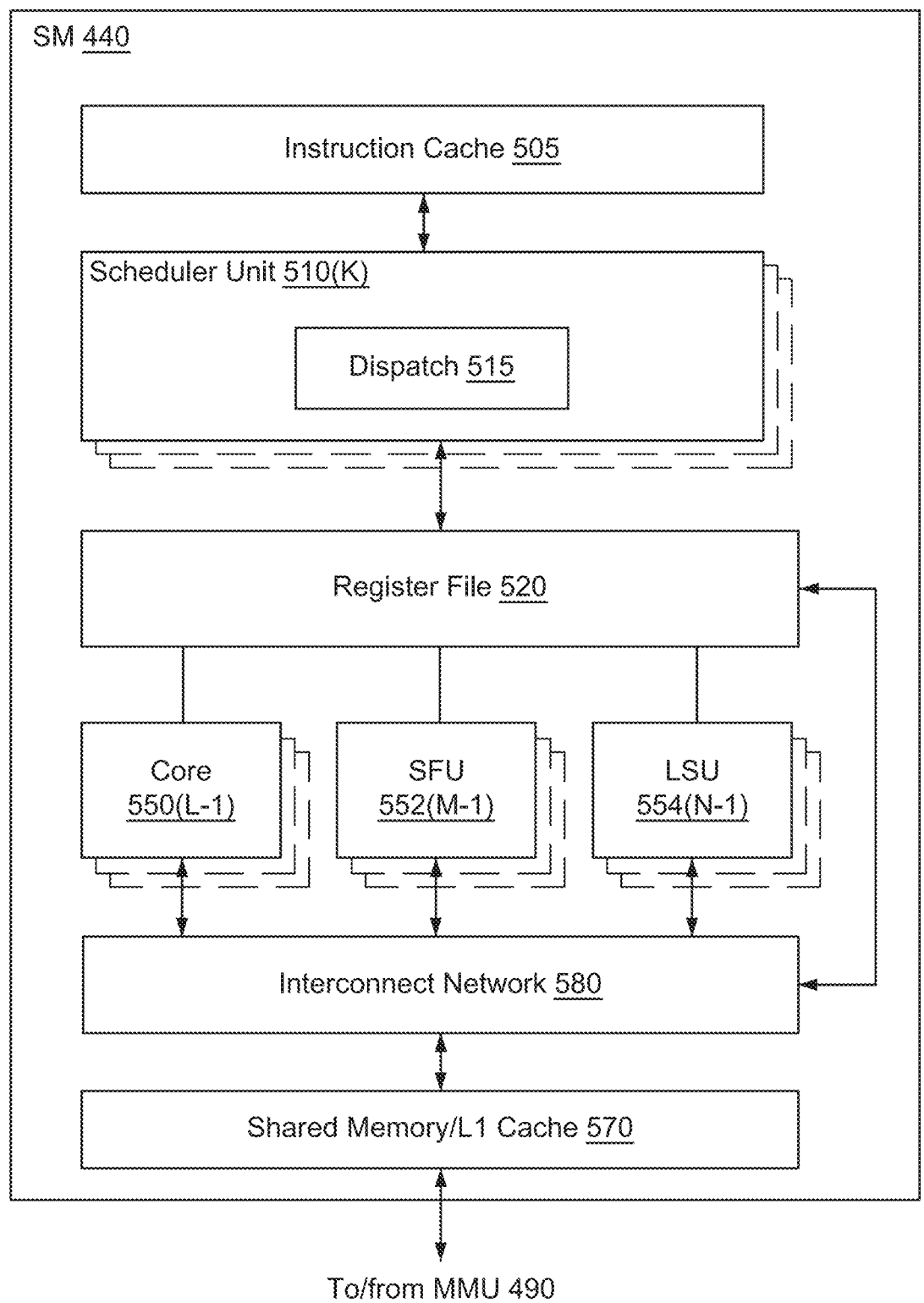
FIG. 5A illustrates the streaming multiprocessor of FIG. 4A, in accordance with an embodiment.

FIG. 5A illustrates the streaming multiprocessor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises MSFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
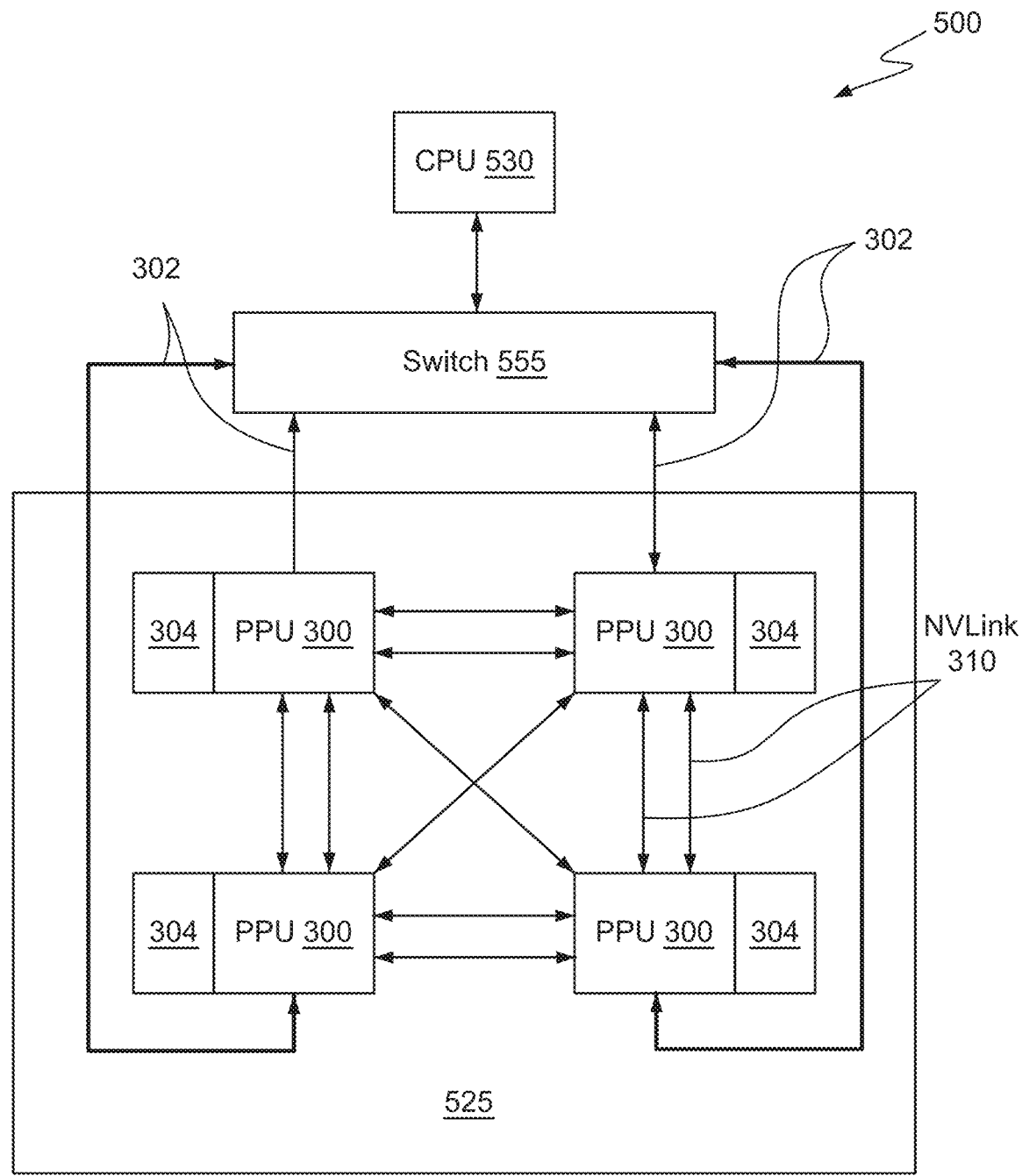
FIG. 5B is a conceptual diagram of a processing system implemented using the parallel processing unit (PPU) of FIG. 3, in accordance with an embodiment.

FIG. 5B is a conceptual diagram of a processing system 500 implemented using the PPU 300 of FIG. 3, in accordance with an embodiment. The exemplary system 500 may be configured to implement the methods 220 and 240 shown in FIGS. 2B-C and/or the systems illustrated in any of FIGS. 1A and 2A. The processing system 500 includes a CPU 530, switch 555, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 555 interfaces between the interconnect 302 and the CPU 530. The PPUs 300, memories 304, and NVLinks 310 may be situated on a single semiconductor platform to form a parallel processing module 525. In an embodiment, the switch 555 supports two or more protocols to interface between various different connections and/or links.

In another embodiment (not shown), the NVLink 310 provides one or more high-speed communication links between each of the PPUs 300 and the CPU 530 and the switch 555 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 555 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 555. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 555, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
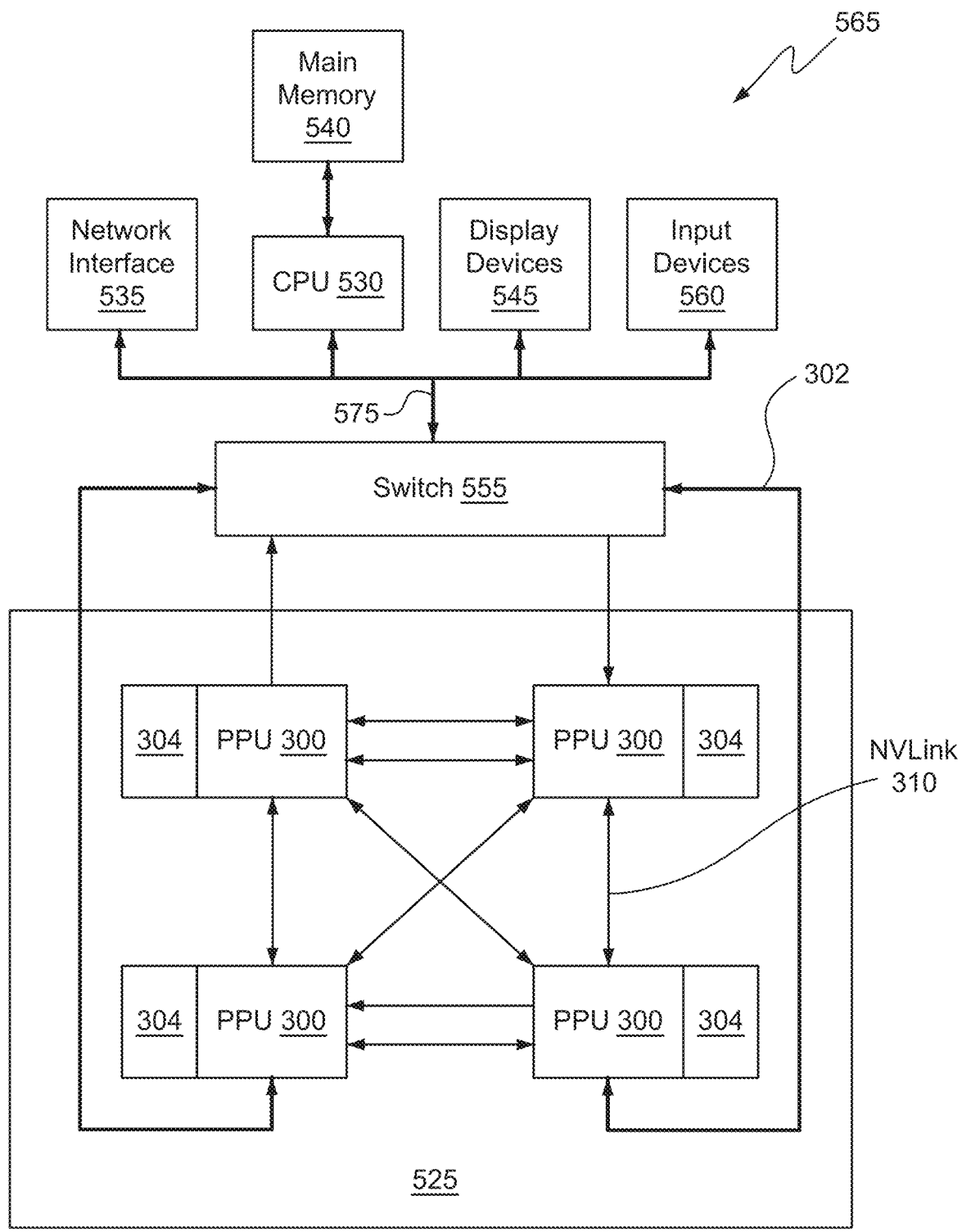
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
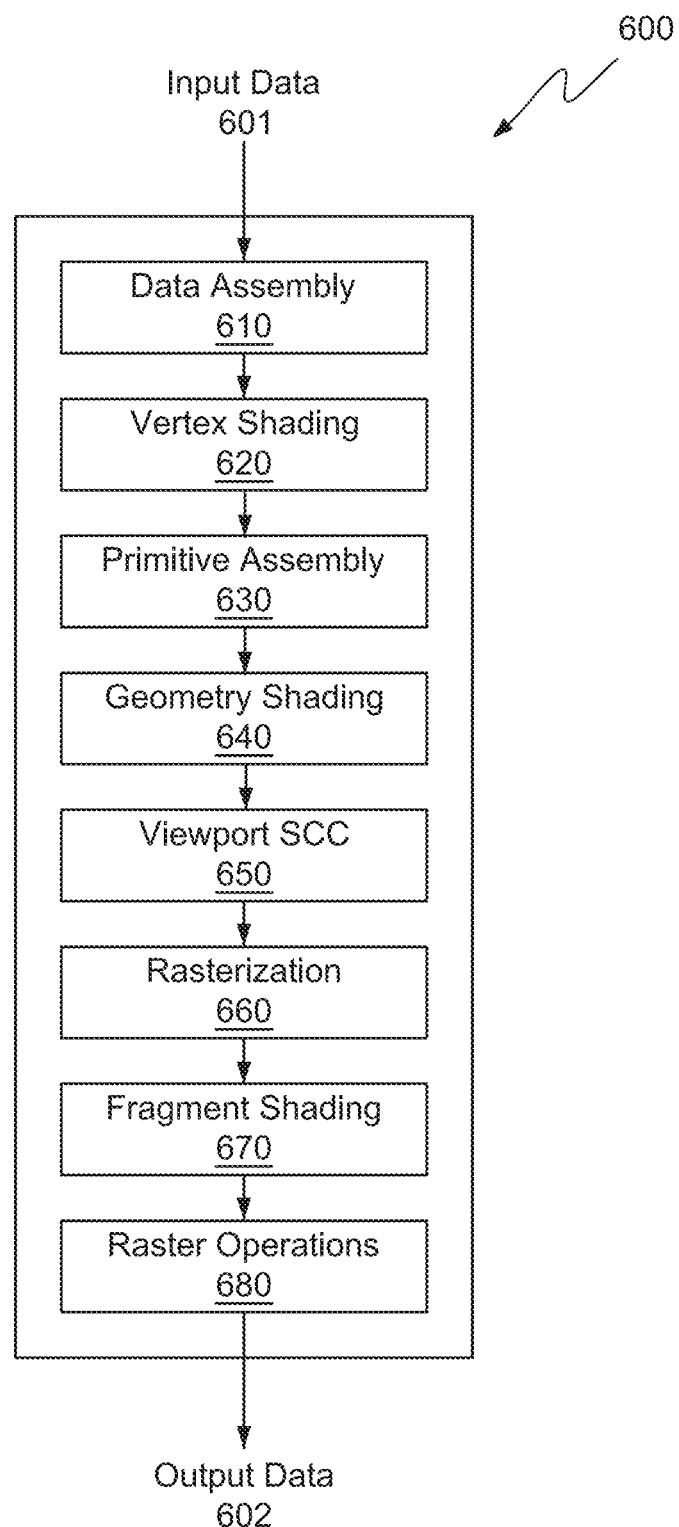
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Example Technical Advantages of Some Embodiments

Certain example embodiments provide for improved system performance by reducing memory access latencies for texture information access during graphics processing.

As noted above, conventional latency hiding techniques such as pipelining may not be sufficient to alleviate the performance degradations caused by relatively long latencies incurred for accessing texture maps and the like during graphics processing. The conventional prefetching techniques too, which have mostly been applied in relation to the CPU, may not be adequate for the highly parallel GPUs and for texture information that have different storage and access characteristics than the typical CPU workloads. Thus, by providing for improved system performance by reducing memory access latencies for texture information, certain embodiments of the present invention enable more of the processing speed improvements provided by faster processors to be preserved rather than be subject to degradations because of long memory access latencies.

In certain example embodiments the additional circuitry required at the texture units and the L2 cache in certain example embodiments is economically and efficiently incorporated into the circuitry of texture processing units and the L2 cache control circuitry, thereby providing an efficient technique by which to improve the speeds associated with texture accesses. Moreover, by optimizing for certain frequent memory access patterns, example embodiments speed up at least some of the memory accesses.

While the speedup achieved in example embodiments by more efficient memory access of texture maps is helpful in many types of applications, the speedup may be particularly helpful in games with very fast screen changes and/or actions, and highly time-critical applications such as, but not limited to, automotive displays (e.g. autonomous vehicle displays etc.) and the like.

Numerous modifications and variations of the present invention are possible in light of the above teachings. It is therefore to be understood that within the scope of the appended claims, the invention may be practiced otherwise than as specifically described herein.

What is claimed is:

1. A method of displaying a scene, comprising:
   while performing texture mapping of the scene using a first block of a stored texture, generating a prefetch request, by a processor, to retrieve all or part of a second block of the stored texture from a first level memory of a memory hierarchy;
   retrieving said all or part of the second block from the first level memory in response to the prefetch request;
   storing the retrieved all or part of the second block in an area of a second level of memory of the memory hierarchy, wherein said area of the second level of memory is accessible by the processor and another processor, and wherein the second level of memory is an intermediate level of memory between the first level of memory and a third level of memory in the memory hierarchy;
   performing texture mapping of the scene using the retrieved all or part of the second block; and
   rendering the scene to a display device.

2. The method according to claim 1, wherein the texture mapping of the scene using the first block is performed by the processor and the texture mapping of the scene using the second block is performed by said another processor.

3. The method according to claim 1, wherein an address for the all or part of the second block is dynamically calculated by the processor based on a block size value determined from header information of the texture, and wherein said block size value is different from another block size value indicated for another texture.

4. The method according to claim 3, wherein the address for the all or part of the second block is determined based further on an address of the first block, and wherein the prefetch request includes the determined address of the all or part of second block and/or the block size value determined from the header information of the texture.

5. The method according to claim 4, wherein the first block and the second block each includes an integer number of texels stored in the first level of memory in a block linear layout in a same texture map.

6. The method according to claim 1, wherein the method further includes counting a number of outstanding prefetch requests, and if the number of outstanding prefetch requests is less than a threshold, transmitting the prefetch request to the first level memory, otherwise dropping the prefetch request without transmitting it to the first level memory.

7. The method according to claim 6, wherein the counting, the transmitting and the dropping being performed in circuitry associated with the second level memory.

8. The method according to claim 1, wherein the method further includes determining whether the requested all or part of the second block is present in the second level in the memory hierarchy, and, if determined to be present, dropping the prefetch request without transmitting the prefetch request to the first memory.

9. The method according to claim 8, wherein the dropping is performed in circuitry associated with the second level memory.

10. The method according to claim 8, wherein the dropping being performed in circuitry associated with the processor.

11. The method according to claim 1, wherein the processor and said another processor access respectively different areas in the third level in respective L1 caches.

12. The method according to claim 1, further comprising detecting that the texture mapping is part of a fullscreen draw, and performing said generating the prefetch request in response to the detecting.

13. The method according to claim 1, wherein said storing comprises storing the retrieved all or part of the second block is stored in an area of the second level of memory without being stored in the third level of memory.

14. The method according to claim 13, wherein the retrieved all or part of the second block that is stored in the second level of memory is, in response to a subsequent fetch request from the processor or the another processor, subsequently stored in the third level of memory.

15. A parallel processing system for displaying a scene, comprising:
a plurality of processors;
a cache hierarchy including at least a first level cache memory and a second level cache memory;
a display interface; and
a memory interface configured to provide the plurality of processors access to an off-chip memory,
wherein the plurality of processors and control circuitry associated with the cache hierarchy are configured to:
while performing texture mapping of the scene using a first block of a stored texture, generating a prefetch request, by a first processor from the plurality of processors, to retrieve all or part of a second block of the stored texture from a memory hierarchy which includes the cache hierarchy;
retrieving the requested all or part of the second block from the off-chip memory over the memory interface in response to the prefetch request;
storing the retrieved all or part of the second block in an area of the second level cache memory, wherein said area of the second level cache memory is accessible by the first processor and a second processor from the plurality of processors, and wherein the second level cache memory is an intermediate level of memory between the off-chip memory and the first level cache memory;
performing texture mapping of the scene using the retrieved all or part of the second block; and
rendering the scene to a display device over the display interface.

16. The parallel processing system according to claim 15, wherein the texture mapping of the scene using the first block is performed by the first processor and the texture mapping of the scene using the second block is performed by said second processor.

17. The parallel processing system according to claim 15, wherein an address for said all or part of the second block is dynamically calculated by the first processor based on a block size value determined from header information of the texture, and wherein said block size value is different from another block size value indicated for another texture.

18. The parallel processing system according to claim 17, wherein the address for said all or part of the second block is determined based further on an address of the first block, and wherein the prefetch request includes the determined address of the second block and/or the block size value determined from the header information of the texture.

19. The parallel processing system according to claim 18, wherein the first block and the second block each includes an integer number of texels stored in the off-chip memory in a block linear layout in a same texture map.

20. The parallel processing system according to claim 15, further comprising request throttle circuitry connected to the second level cache memory, wherein the throttle circuitry is configured to count a number of outstanding prefetch requests, and if the number of outstanding prefetch requests is less than a threshold transmitting the prefetch request to the off-chip memory via the memory interface, otherwise dropping the prefetch request without transmitting it to the off-chip memory.

21. The parallel processing system according to claim 15, further comprising request deduplication circuitry, wherein the deduplication circuitry is configured to determine whether the second block is present in the second level cache memory, and, if determined to be present, dropping the prefetch request without transmitting the prefetch request to the off-chip memory.

22. The parallel processing system according to claim 21, wherein the request deduplication circuitry is connected to the first processor.

23. A system-on-chip (SoC) comprising:
at least one central processing unit (CPU); and
at least one parallel processing unit (PPU) connected to the CPU,
wherein each PPU comprises:
a plurality of multiprocessors;
a plurality of special function units;
a cache hierarchy including at least a first level cache memory and a second level cache memory; and
a memory interface configured to provide access to an off-chip memory,
wherein the plurality of special function units and control circuitry associated with the cache hierarchy are configured to, in response to an instruction received from one of the multiprocessors, perform:
while texture mapping of a scene using a first block of a stored texture, generating a prefetch request, by a first special function unit from the plurality of special function units, to retrieve all or part of a second block of the stored texture from a memory hierarchy which includes the cache hierarchy;
retrieving the requested all or part of the second block from the off-chip memory over the memory interface in response to the prefetch request;
storing the retrieved all or part of the second block in an area of the second level cache memory, wherein said area of the second level cache memory is accessible by the first special function unit and a second special function unit from the plurality of special function units, and wherein the second level cache memory is an intermediate level of memory between the off-chip memory and the first level cache memory;
texture mapping of the scene using the retrieved all or part of the second block; and
rendering the scene to a display device over a display interface.

* * * * *